(12) United States Patent
Wright

(10) Patent No.: US 6,758,010 B2
(45) Date of Patent: Jul. 6, 2004

(54) DISPLAY APPARATUS

(76) Inventor: W. Michael Wright, 1222 Bells Rd., Virginia Beach, VA (US) 23454

( * ) Notice: Subject to any disclaimer, the term of this patent is extended or adjusted under 35 U.S.C. 154(b) by 0 days.

(21) Appl. No.: 10/270,165

(22) Filed: Oct. 15, 2002

(65) Prior Publication Data

US 2004/0068926 A1 Apr. 15, 2004

(51) Int. Cl.$^7$ .............................. A01G 9/02; F16M 13/00
(52) U.S. Cl. ........................................... 47/67; 248/318
(58) Field of Search ................................. 47/66.1, 66.6, 47/67, 39, 41.01, 44, 47; 248/317, 318, 343, 27.8, 181.2; D6/513; D11/148

(56) References Cited

U.S. PATENT DOCUMENTS

| | | | | | |
|---|---|---|---|---|---|
| 1,095,504 | A | * | 5/1914 | Jannoch | 47/67 |
| D50,329 | S | * | 2/1917 | White | D11/148 |
| 1,233,538 | A | * | 7/1917 | Alden | 59/78.1 |
| 3,957,242 | A | * | 5/1976 | Holtz | 248/318 |
| 4,078,753 | A | * | 3/1978 | Cole | 248/612 |
| 4,189,124 | A | * | 2/1980 | Faris | 248/318 |
| 4,314,646 | A | * | 2/1982 | Purnell | 211/113 |
| 4,605,191 | A | * | 8/1986 | Kagan | 248/318 |
| D285,634 | S | * | 9/1986 | McBean | D6/513 |
| 4,658,540 | A | * | 4/1987 | Hougard | 47/67 |
| 4,875,653 | A | * | 10/1989 | Connolly | 248/332 |
| D445,063 | S | * | 7/2001 | Schneider et al. | D11/148 |

* cited by examiner

*Primary Examiner*—Charles T. Jordan
*Assistant Examiner*—Francis T. Palo
(74) *Attorney, Agent, or Firm*—Nixon & Vanderhye P.C.

(57) ABSTRACT

The display apparatus includes a multi-sided or annular shell which may serve as a container per se for displaying an article or combined with a decorative outer shell to form a composite container. A suspension system for the container includes a plurality of brackets, each forming an aperture with adjoining side walls of the container or inner shell, flexible lines and a connecting element including a universal joint for suspending the apparatus from a support. The lower end of each line has a keeper for preventing withdrawal of the line from the bracket. The lines at their upper ends are secured to a wire loop having a hook superposed over a ball for forming a universal connection with the support.

18 Claims, 26 Drawing Sheets

DISPLAY APPARATUS

BACKGROUND OF THE INVENTION

The present invention relates to an apparatus for displaying an article, for example, a plant, flowers or the like, and particularly relates to a system for suspending a container for the article from a support and to the container per se.

There are many types and configurations of containers for displaying articles. For example, plants, flowers and the like are typically displayed in a container, e.g., a pot, oftentimes supported from below, for example, by a stand. Also, various types of containers for plants, flowers and the like have been suspended from an overhead hook. Suspended flower or plant-containing containers have not previously been particularly attractive or aesthetically pleasing. Also, the apparatus for suspending the container, especially from an inclined overhead support, have taken many forms, most of which are not easily utilized or aesthetically pleasing. Accordingly, there has developed a need for an aesthetically pleasing, highly functional and readily utilized support system for suspending a container, for example, for plants, flowers or the like, particularly adapted for supporting the container from an inclined support, and also for a leakproof, attractive container.

BRIEF DESCRIPTION OF THE INVENTION

In a preferred embodiment of the present invention, there is provided a display apparatus having a container, preferably watertight and formed of a plastic material, which is readily and easily suspended from a support, for example, an inclined support, in a manner affording an aesthetically pleasing appearance. Particularly, the container may be formed of a plastic material whereby the container is waterproof. To suspend the container, a plurality of brackets are disposed at spaced locations about interior surfaces of upper margins of the container for receiving the lower ends of flexible support lines, for example, thick strings formed of a textile, preferably decorative material. The brackets in part define an aperture for receiving the lower ends of the flexible lines. The lower ends of the lines include keepers which engage the brackets to prevent the lines, when taut, from passing through the apertures. The brackets are therefore readily secured to the inside margin of the container by threading the keepers and lower string ends through the apertures and pulling the strings taut.

The suspension system for the container also includes first and second links, secured to one another about a defined pivot axis. The first link may be threaded to a bolt secured to a support, e.g., a ceiling support, and surrounded by a decorative piece. A universal connection is provided between the second link and a connecting element to which upper ends of the flexible lines are attached. Preferably, the second link terminates at its lower end in a portion of a spherical ball. The connecting element preferably comprises a substantially closed loop, preferably formed of a wire having a decorative finish or a color plastic coating, and having a hook adjacent its upper end, e.g., formed by spaced side-by-side wire portions of the connecting element, for engaging about the spherical ball of the second link. This arrangement enables universal movement of the second link and element relative to one another. Thus, by securing the first link to a bolt secured to a support, with the second link depending from the first link about the first pivotal axis and with the upper ends of the flexible lines secured about the closed loop of the connecting element, the connecting element can be readily and easily secured to the spherical ball forming the universal joint therebetween. In this manner, the container is suspended from the ceiling support and without regard to the inclination of the ceiling support.

While the plastic container may be used separately, preferably, the plastic container is surrounded by a decorative second container forming a composite container. For example, the decorative second container may comprise a decorative module formed of finished wood for receiving the plastic container in a nested relation. By forming the interior portions of the second container to match the exterior portions of the first container and securing the two containers one to the other, for example, by an adhesive therebetween, the decorative, aesthetically pleasing, second container is exposed to view.

In a preferred embodiment according to the present invention, there is provided a display apparatus comprising a container for receiving at least one article for display, a system for suspending the container from a support including a mounting assembly and at least three elongated flexible lines extending between the container and the mounting assembly, the mounting assembly having a first link for securing to the support, a second link coupled to the first link and an element connecting the second link and upper ends of the flexible lines, the container including a plurality of support brackets secured thereto, each bracket at least in part defining an aperture, a lower end of each flexible line being secured to the bracket and received through the aperture thereof, each of the flexible lines having a keeper for securing the lower end of the line to the bracket.

In a further preferred embodiment according to the present invention, there is provided a display apparatus comprising a container for receiving at least one article for display and having a multi-sided upper margin, a system for suspending the container from a support including a mounting assembly and at least three elongated flexible lines extending between the container and the mounting assembly, the mounting assembly including an element forming at least in part a universal connection between upper ends of the flexible lines and the support, the container including a plurality of support brackets spaced from one another and secured about interior sides of the upper margin, each bracket at least in part defining an aperture, a lower end of each flexible line being secured to the bracket and received through the aperture thereof, each of the flexible lines having a keeper for securing the lower end of the line to the bracket.

BRIEF DESCRIPTION OF THE DRAWINGS

FIG. 1 is a perspective view of a suspension system for a decorative composite container for receiving articles, for example, plants, flowers and the like;

DETAILED DESCRIPTION OF THE INVENTION

Figure 1:
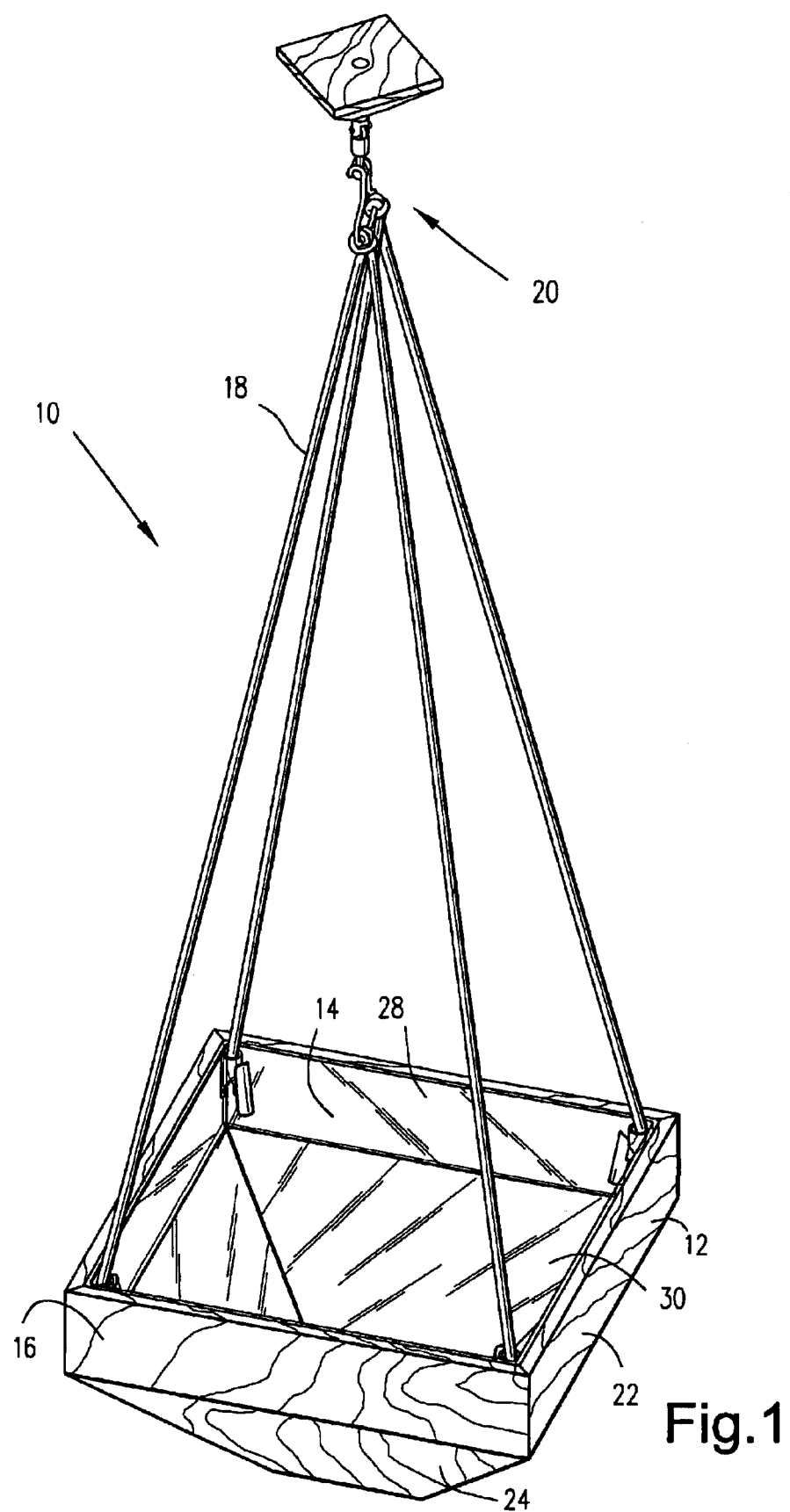
Figure 7:
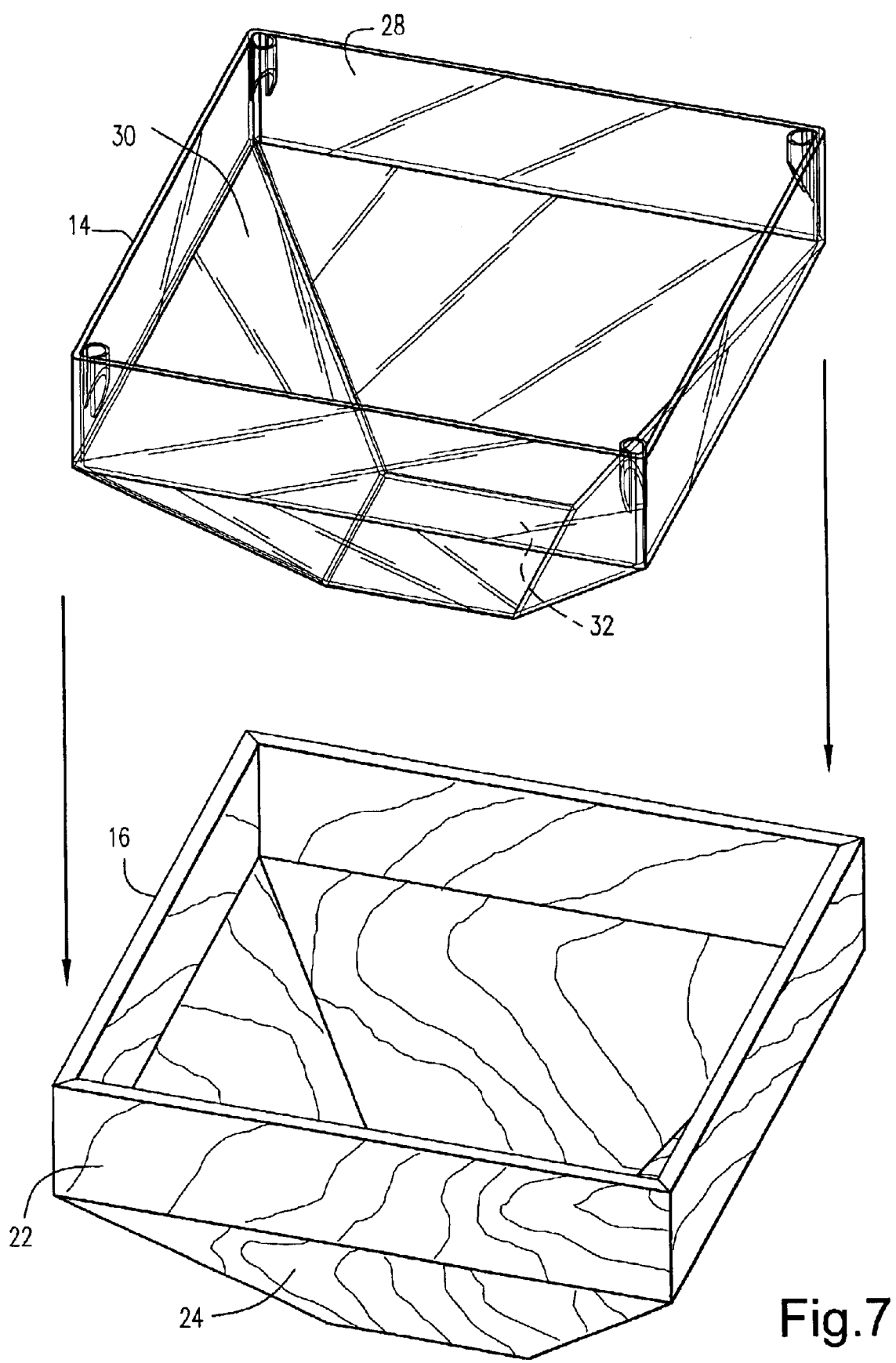
FIG. 7 is a perspective view illustrating a composite container comprised of inner and outer shells prior to the nesting of the shells.
Figure 8:
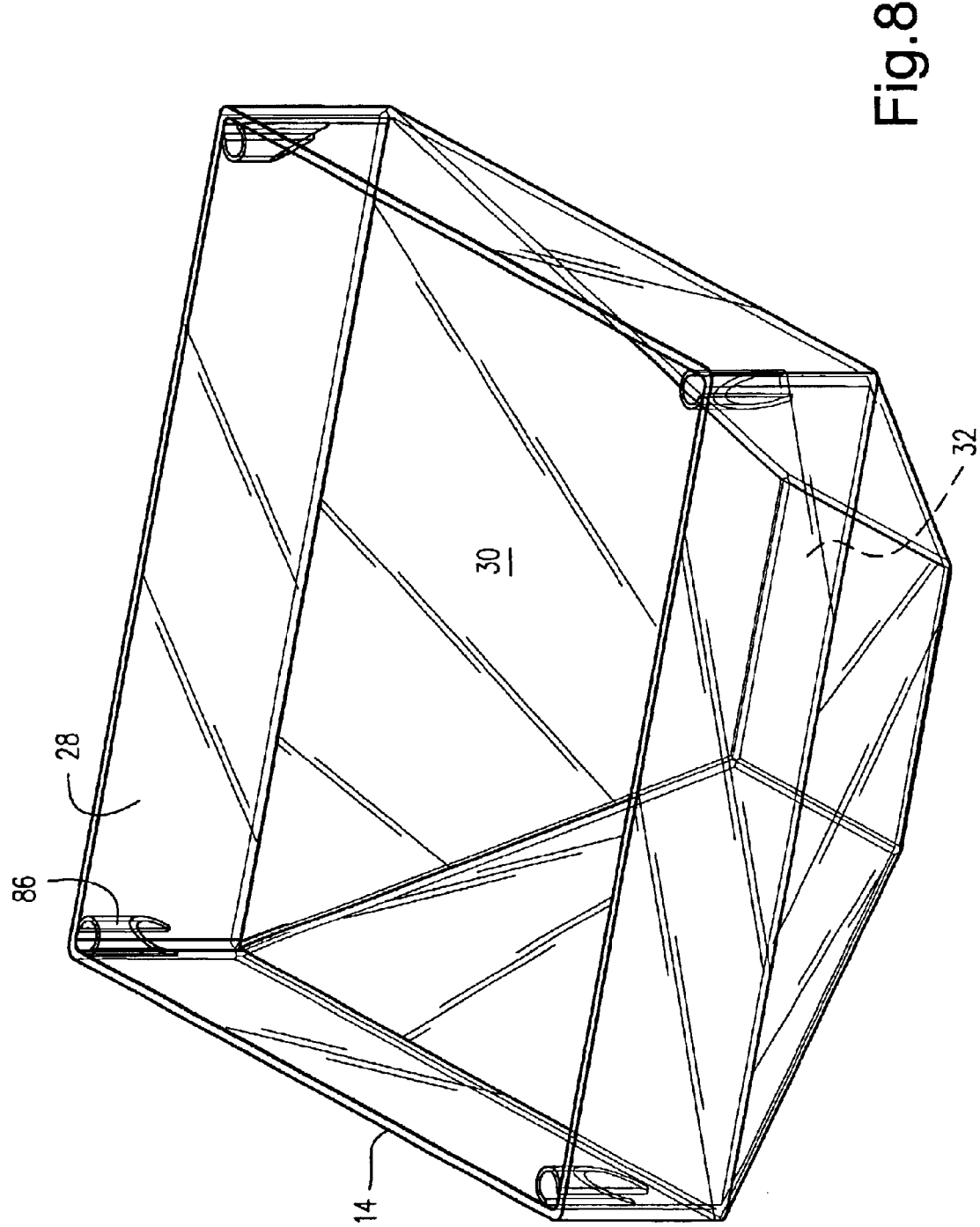
FIG. 8 is a perspective view of a container or an inner shell for a composite container formed of plastic material.
Figure 9:
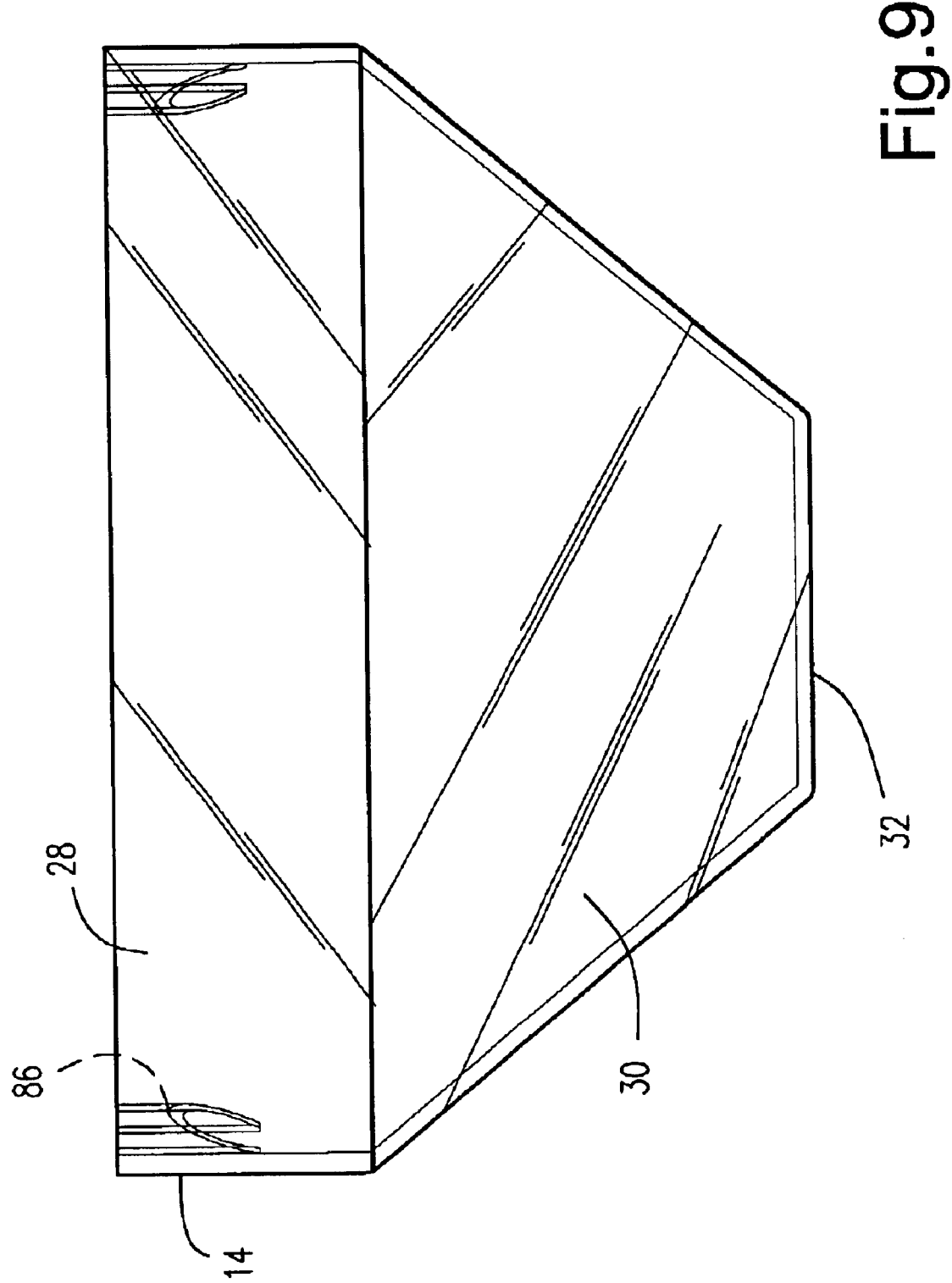
FIG. 9 is a side elevational view thereof.
Figure 10:
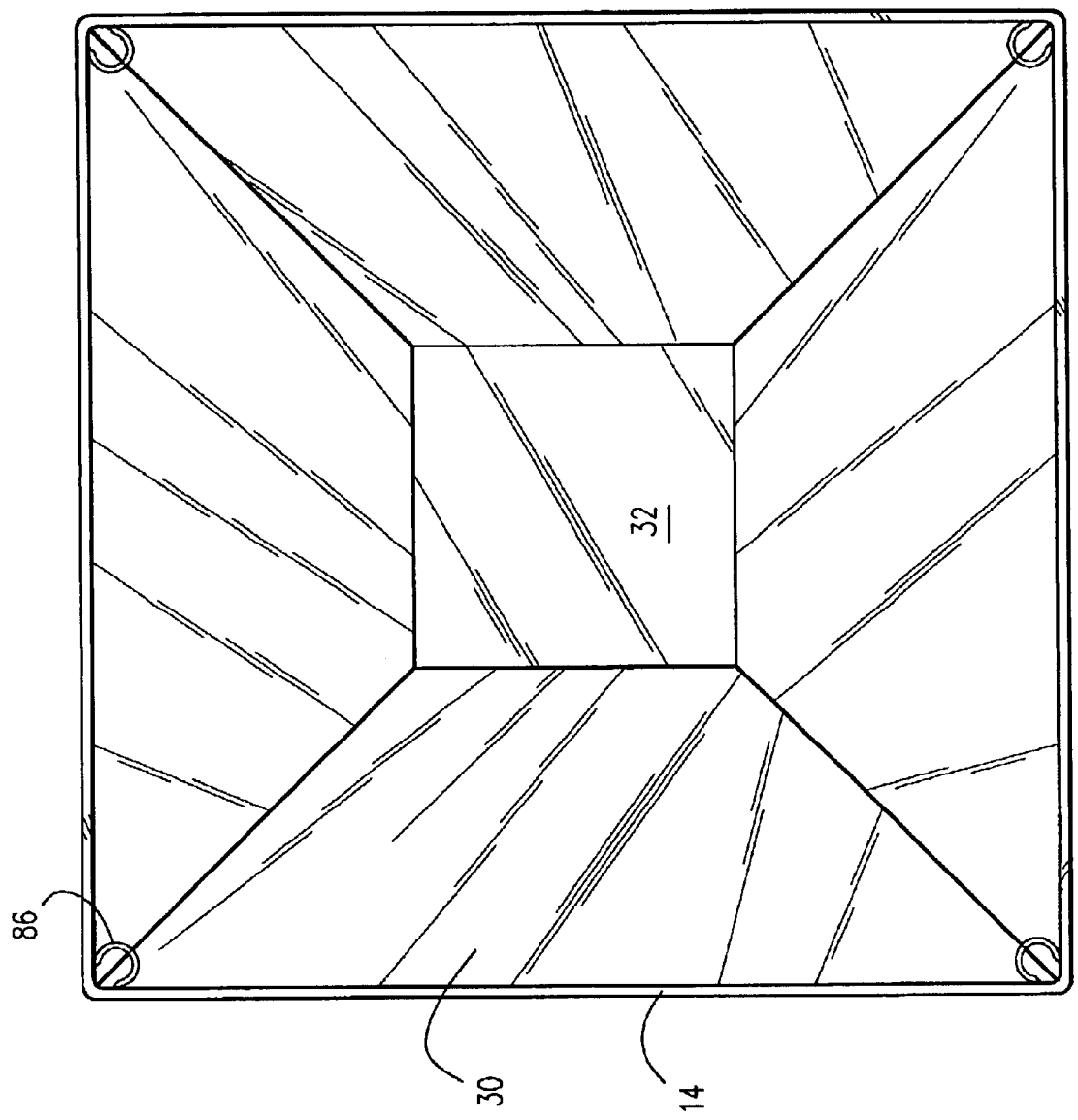
FIG. 10 is a top plan view thereof.
Figure 11:
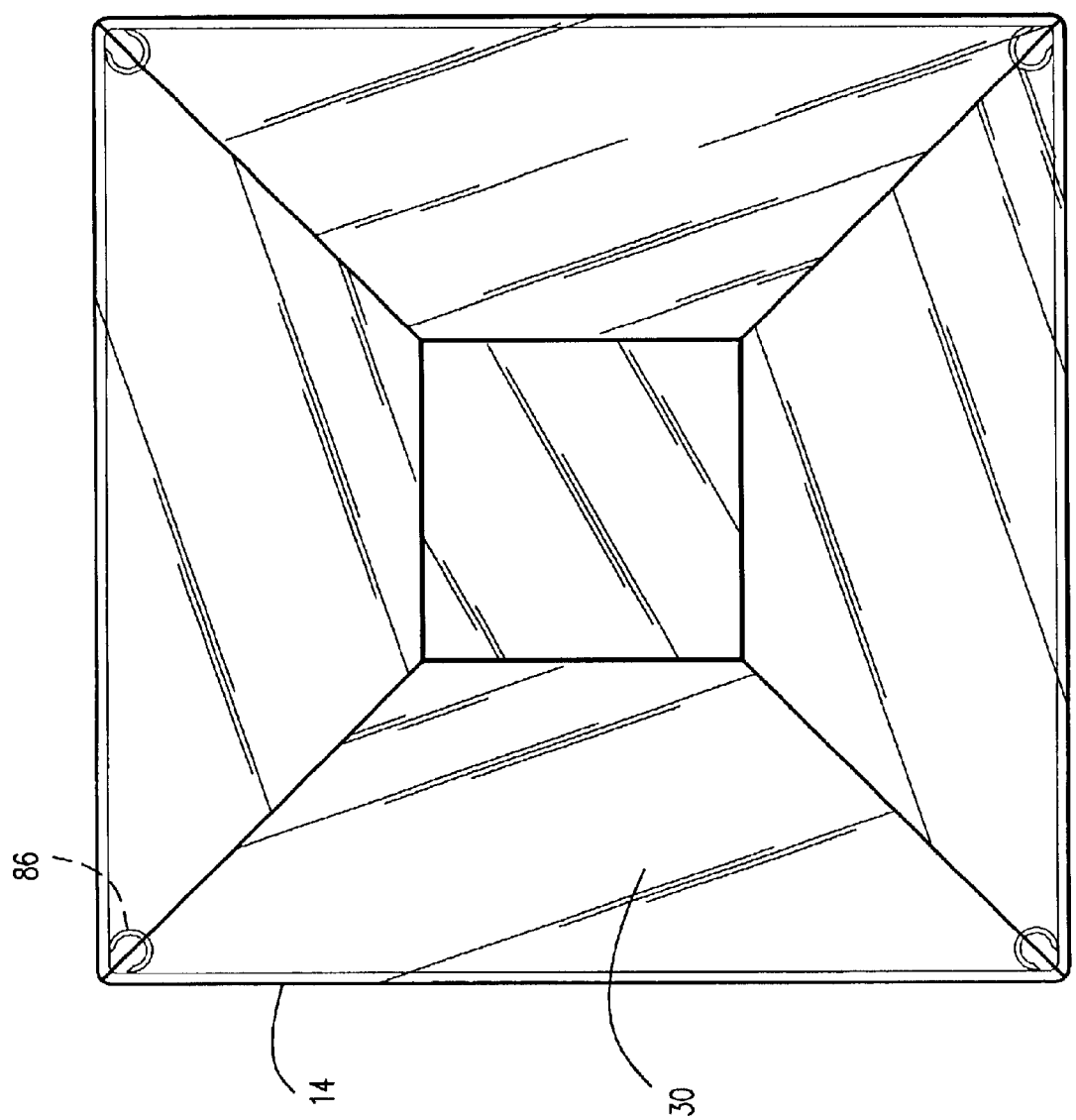
FIG. 11 is a bottom plan view thereof.
Figure 12:
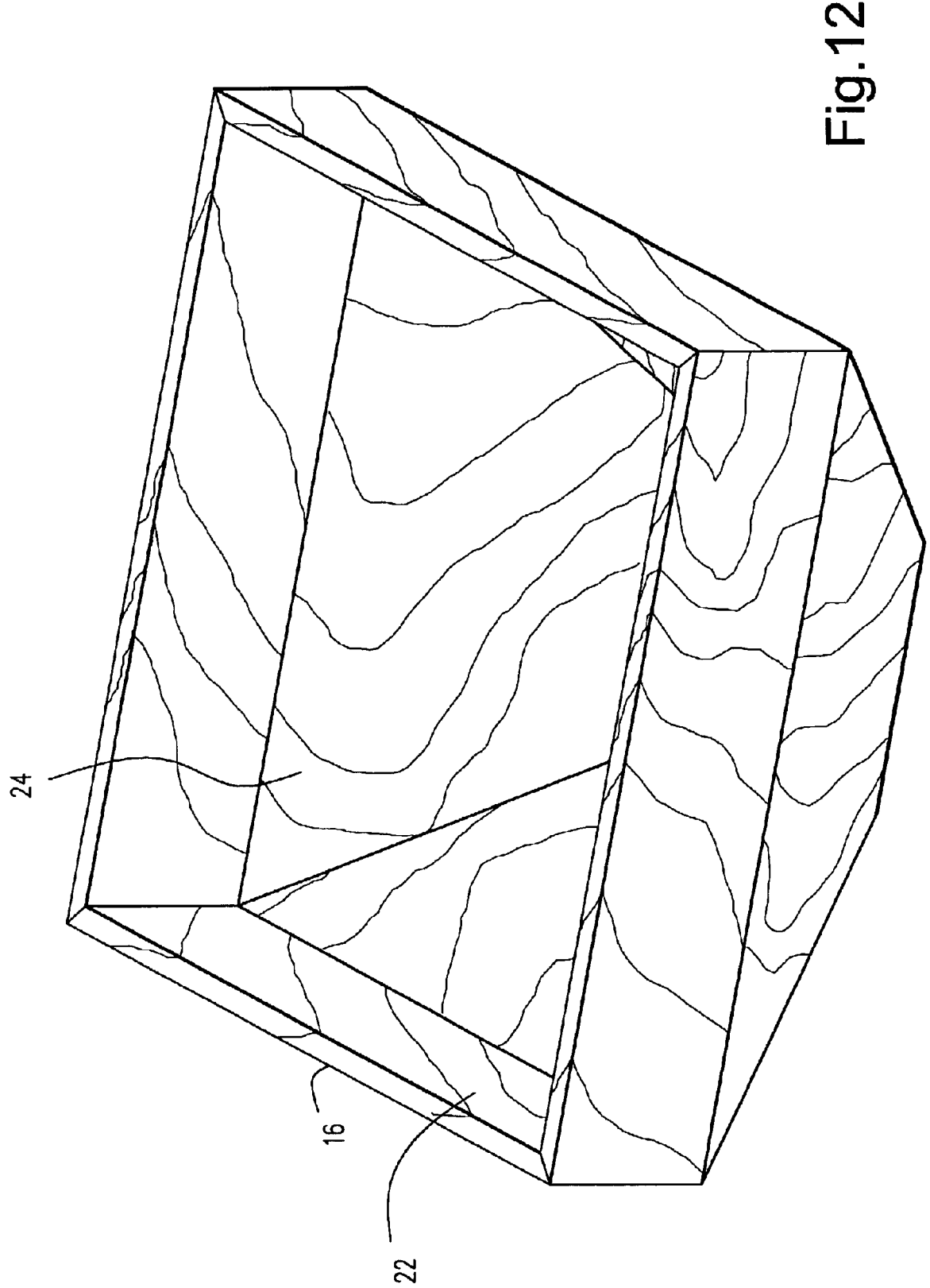
FIG. 12 is a perspective view of an outer shell formed of decorative material forming part of composite container hereof.
Figure 14:
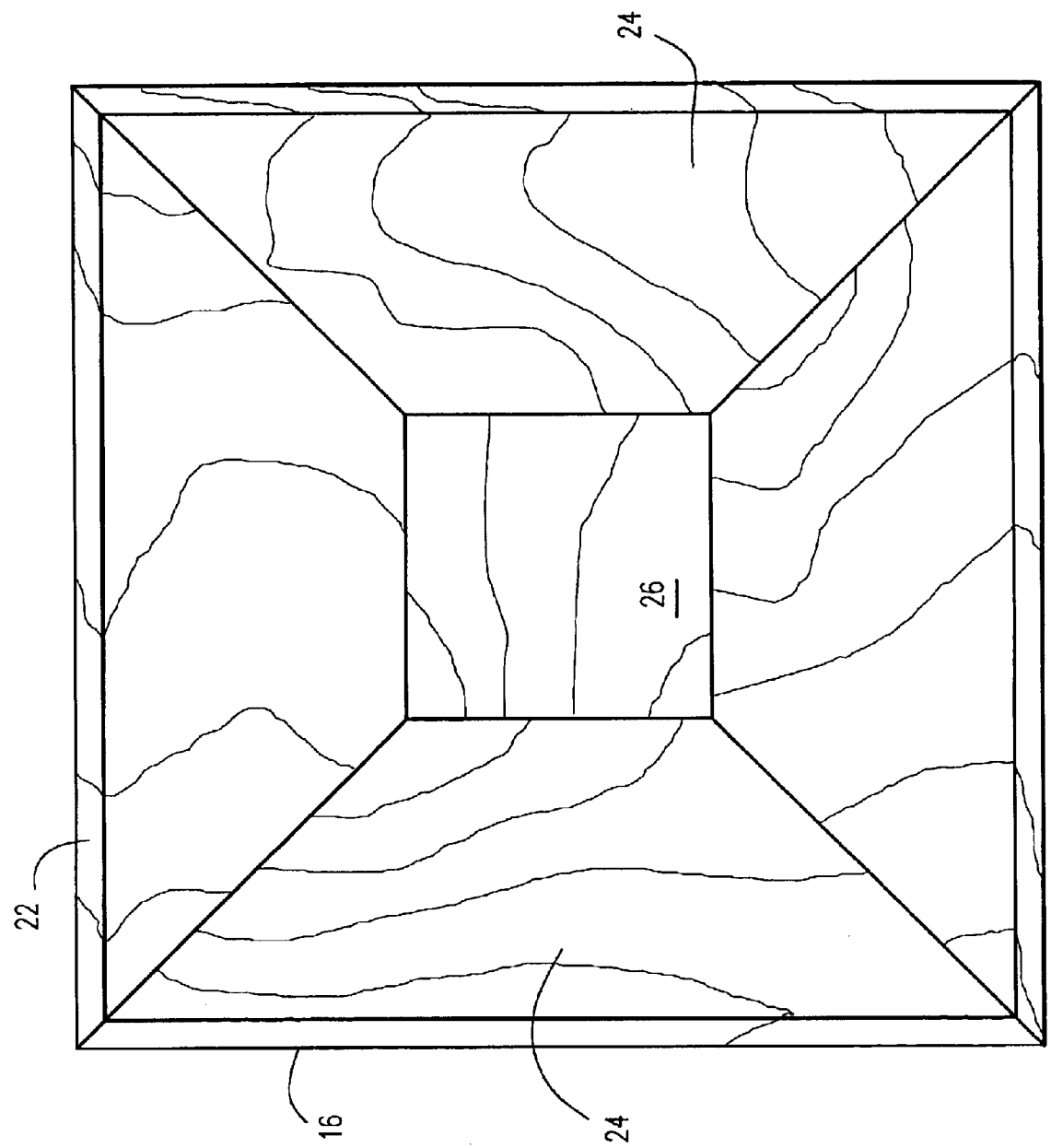
FIG. 14 is a top plan view thereof.
Figure 15:
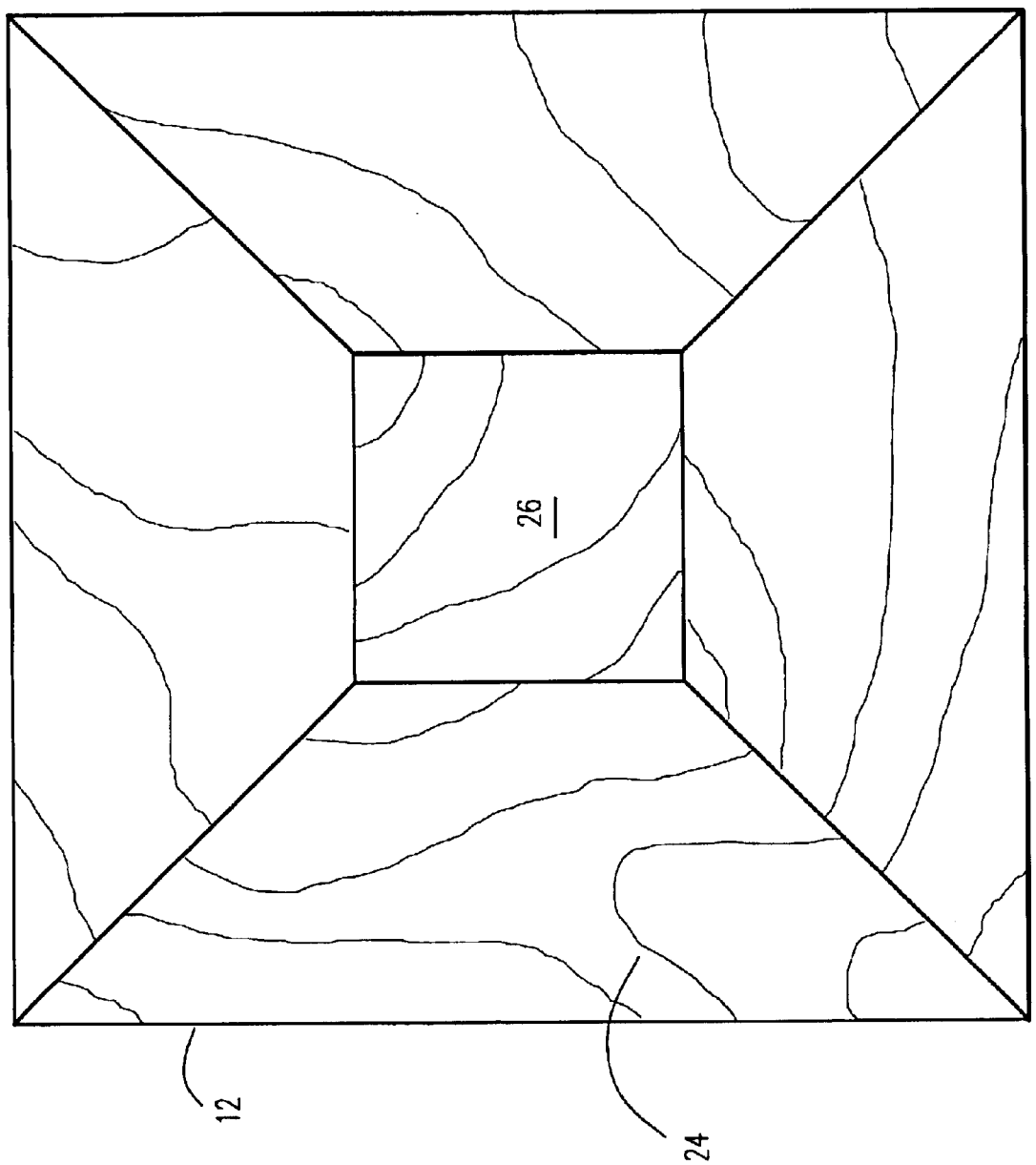
FIG. 15 is a bottom plan view thereof.

Referring to the drawings, particularly to FIG. 1, there is illustrated a display apparatus, for example, for displaying a plant, flowers or the like. The display apparatus, generally designated 10, includes a composite container 12 which, in the illustrated form, includes an inner shell 14 nested within an outer shell 16. The composite container 12 is suspended by a suspension system including a plurality of flexible lines 18 secured to the inner shell 14 at their lower ends and at their upper ends to a ceiling mounting assembly, generally designated 20. The mounting assembly 20 is designed for securement to an ancillary support or wall which may, for example, comprise a ceiling or an inclined support, e.g., an inclined ceiling. Preferably, and in the illustrated form, the inner shell 14 is waterproof, e.g., formed integrally of a plastic material which, when nested within the outer shell 16, forms a waterproof composite container, enabling the outer shell 16 to be formed of decorative material. Thus, outer shell 16 may be formed, for example, from wood which has been finished. In a preferred embodiment as illustrated in FIG. 1, the outer shell 16 has an upper square margin 22 with four depending angled sides 24 terminating in a flat bottom 26 (FIG. 14). The inner shell 14 similarly has a complementary multi-sided configuration, e.g., square margin 28 having four depending sides 30 terminating in a flat bottom 32 (FIG. 7). It will be appreciated that the inner shell 14 nests within the outer shell 16 and that the two shells may be secured to one another to form the composite container 12, for example, by applying adhesive between the two shells.

Figure 2:
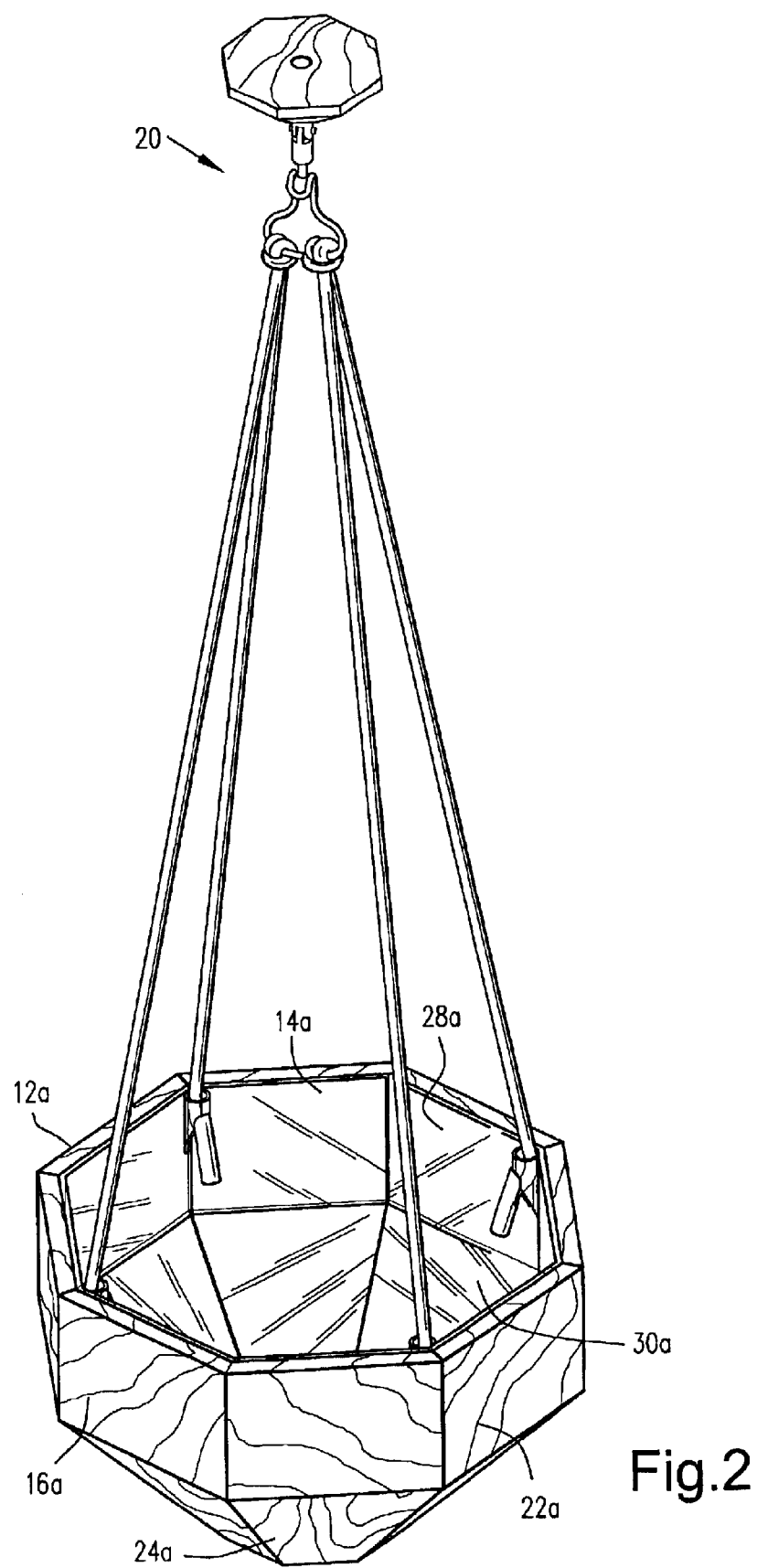
FIG. 2 is a view similar to FIG. 1 illustrating a different form of a composite container hereof.
Figure 17:
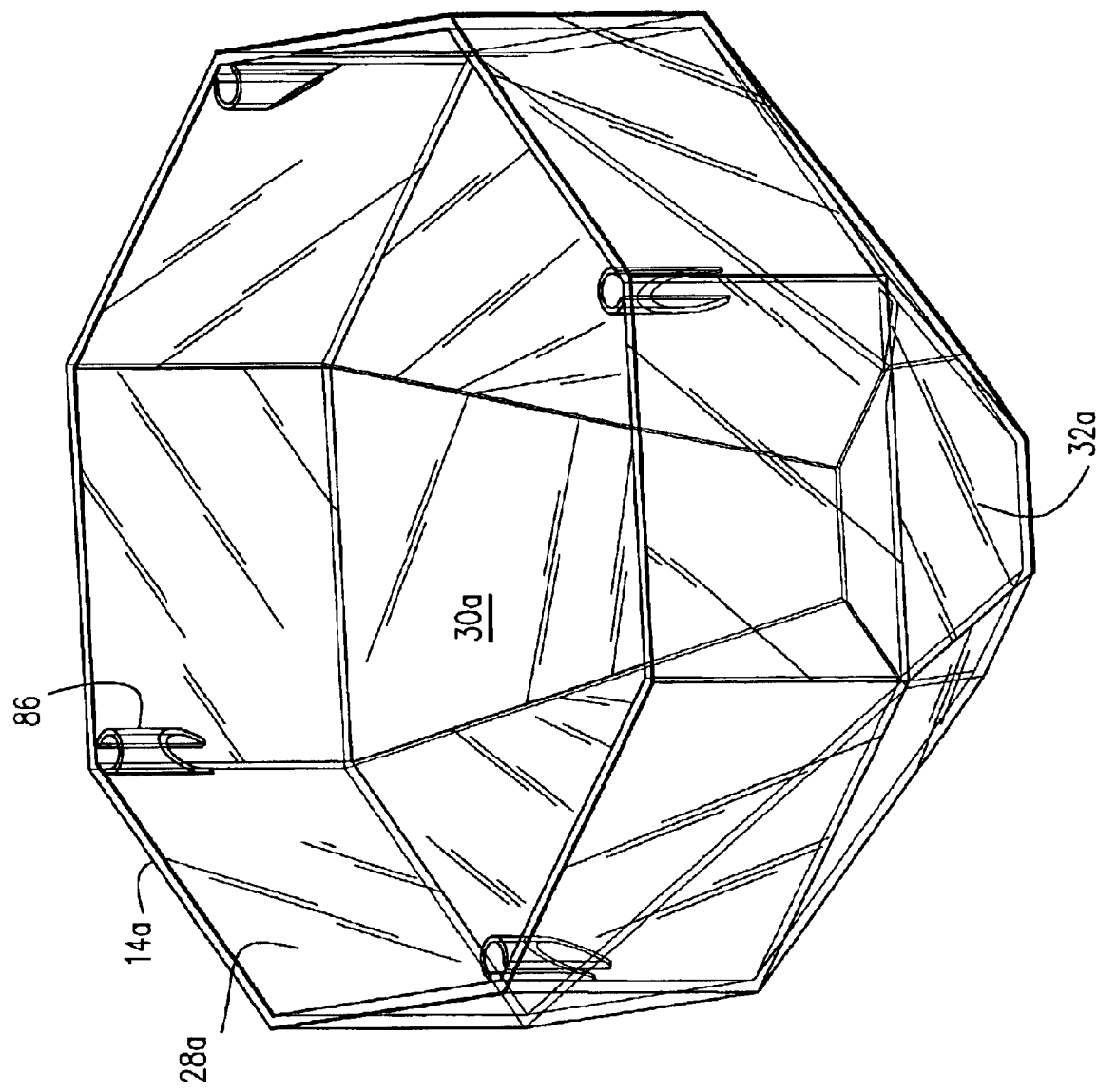
FIG. 17 is a perspective view of an octagonal container or an inner shell for a composite container.
Figure 18:
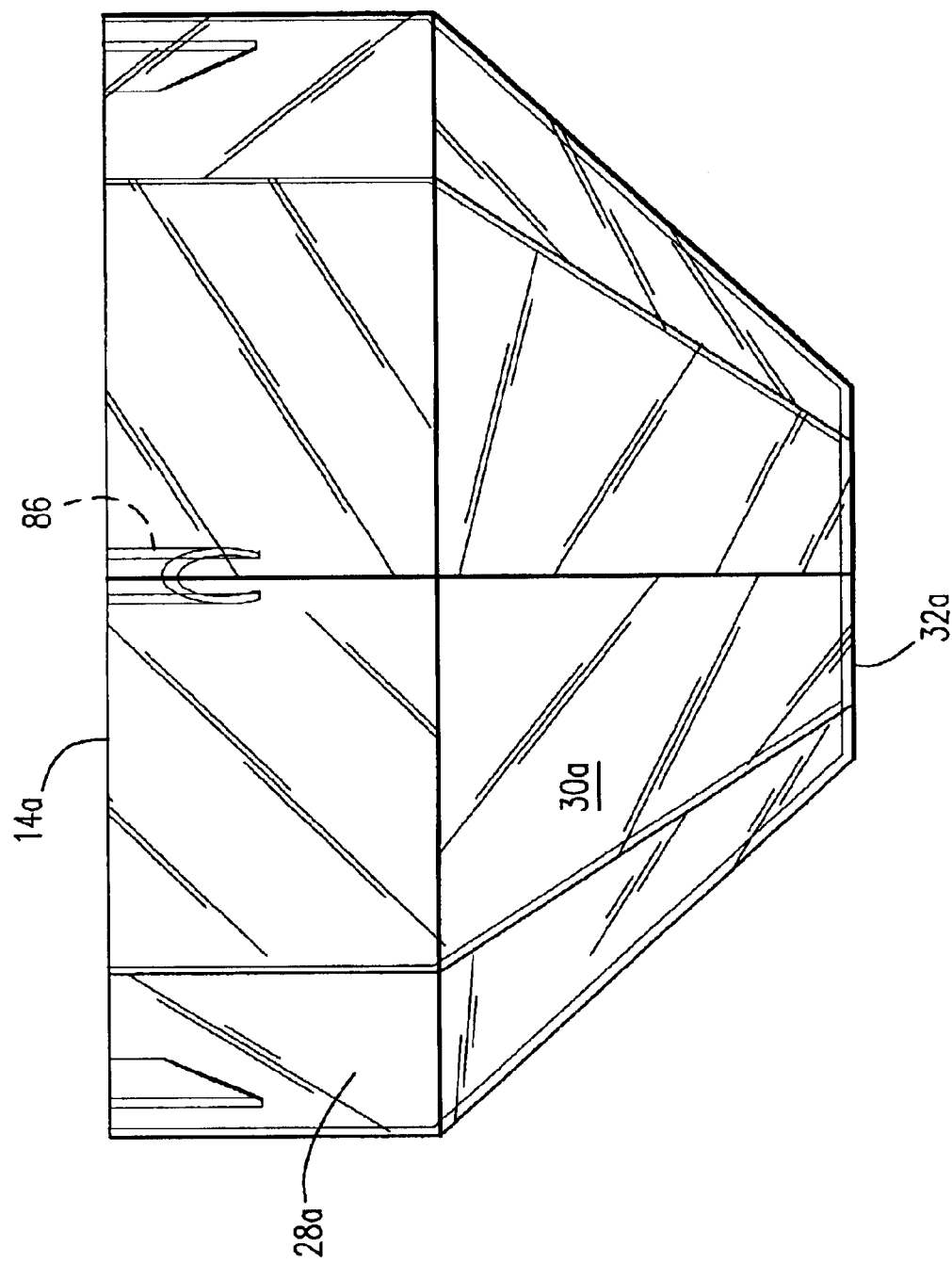
FIG. 18 is a side elevational view thereof.
Figure 19:
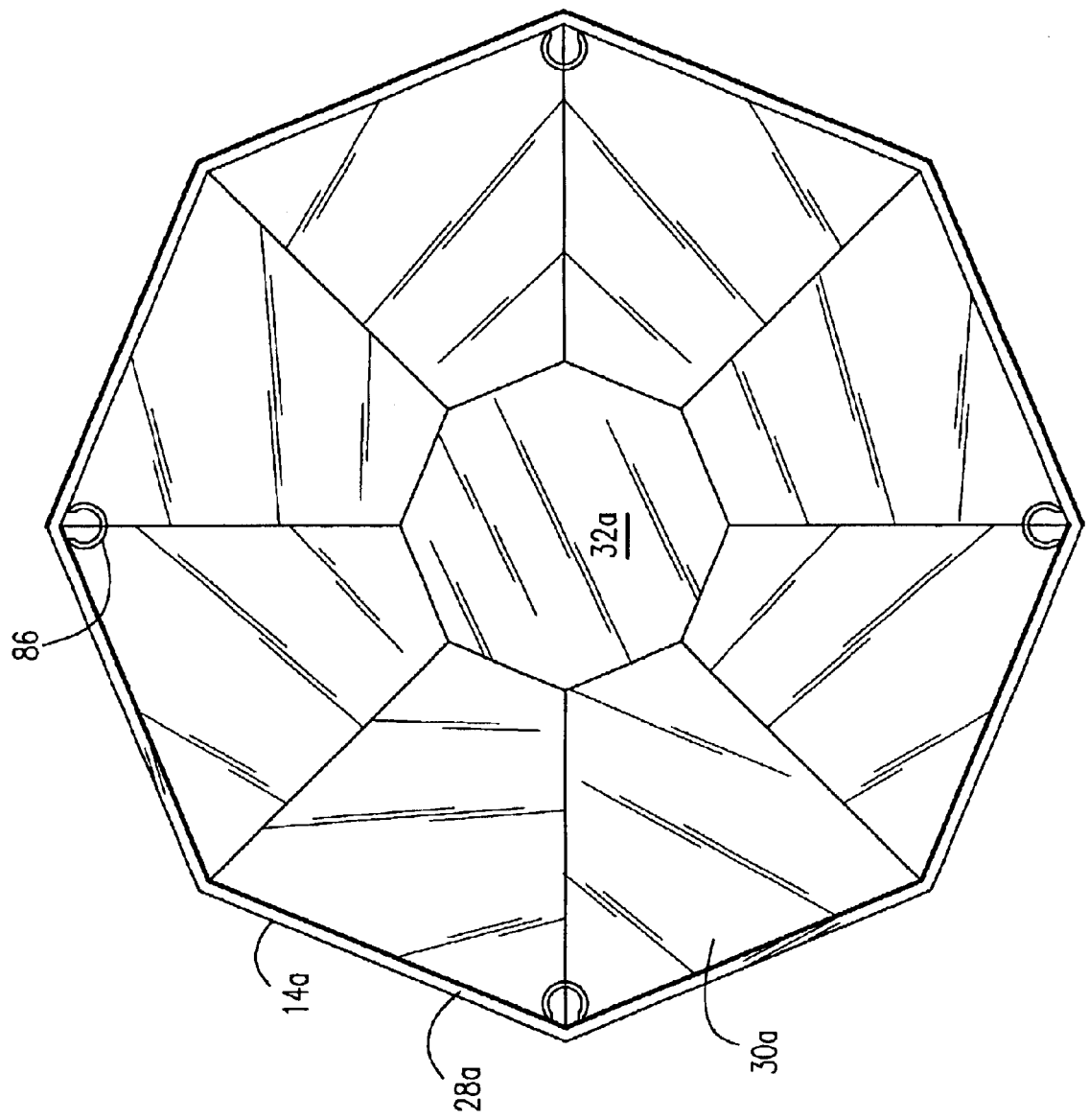
FIG. 19 is a top plan view thereof.
Figure 20:
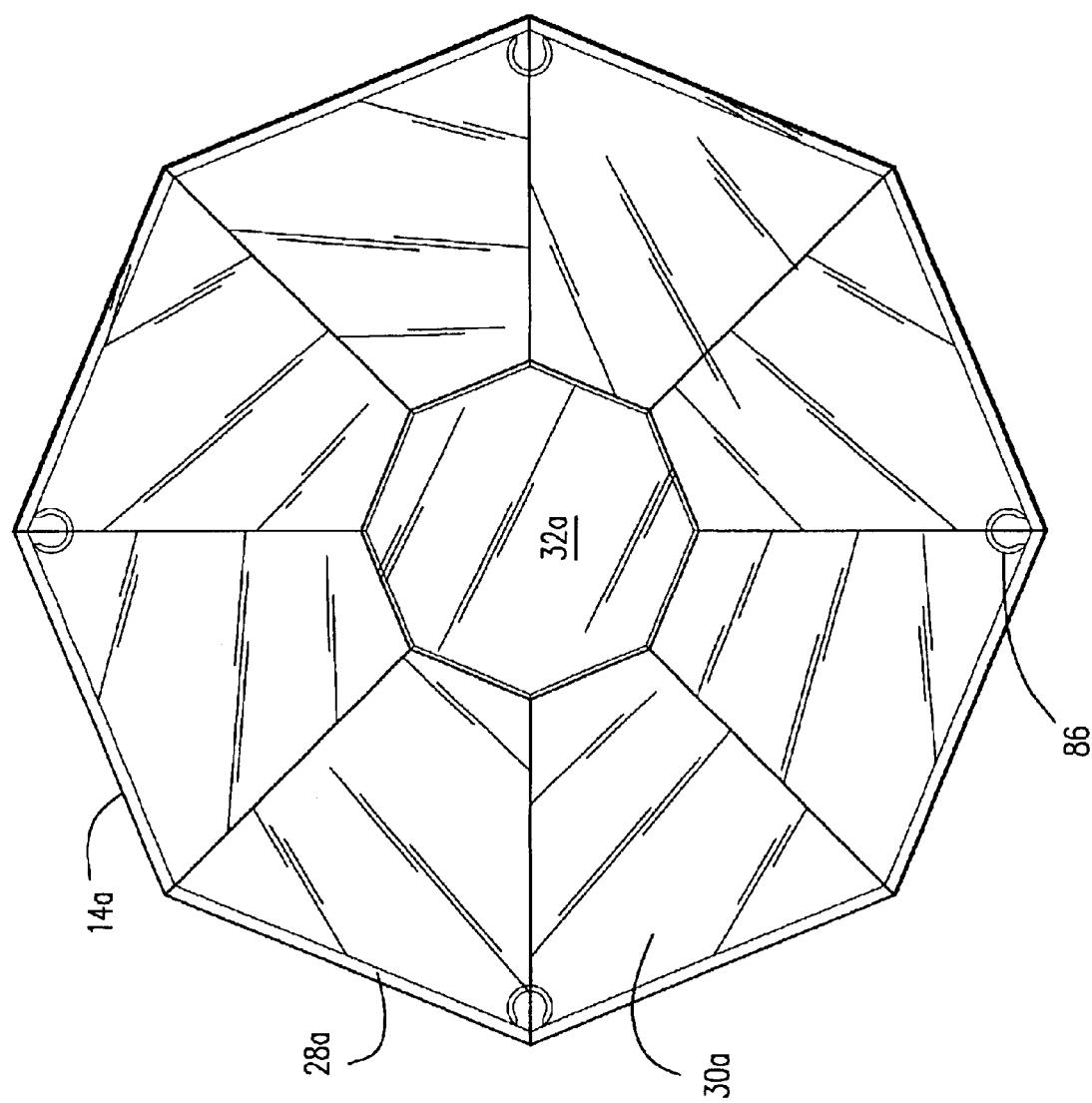
FIG. 20 is a bottom plan view thereof.
Figure 21:
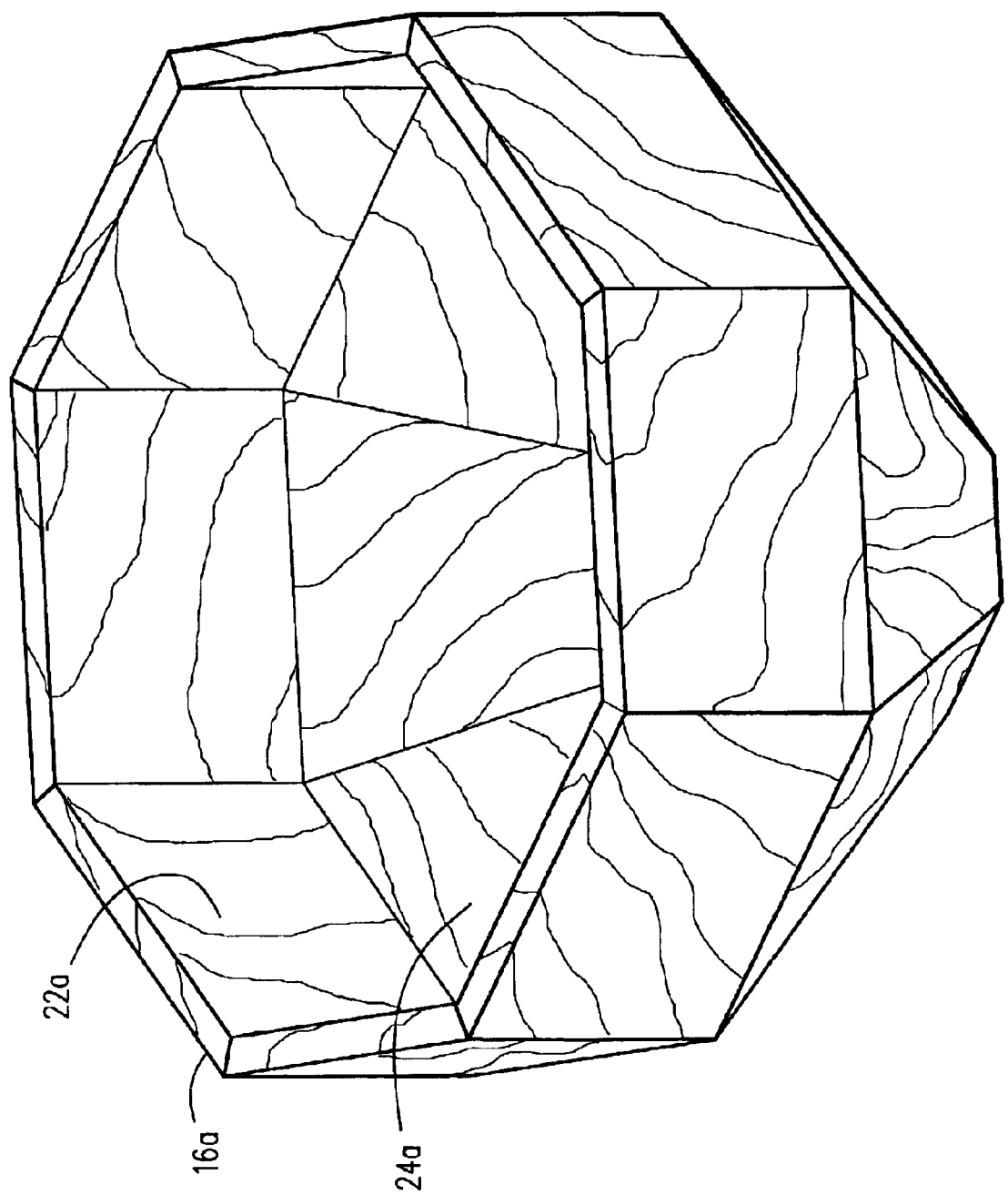
FIG. 21 is a perspective view of an outer shell for a composite container utilizing the container illustrated in FIGS. 17–20 as an inner shell therefor.
Figure 24:
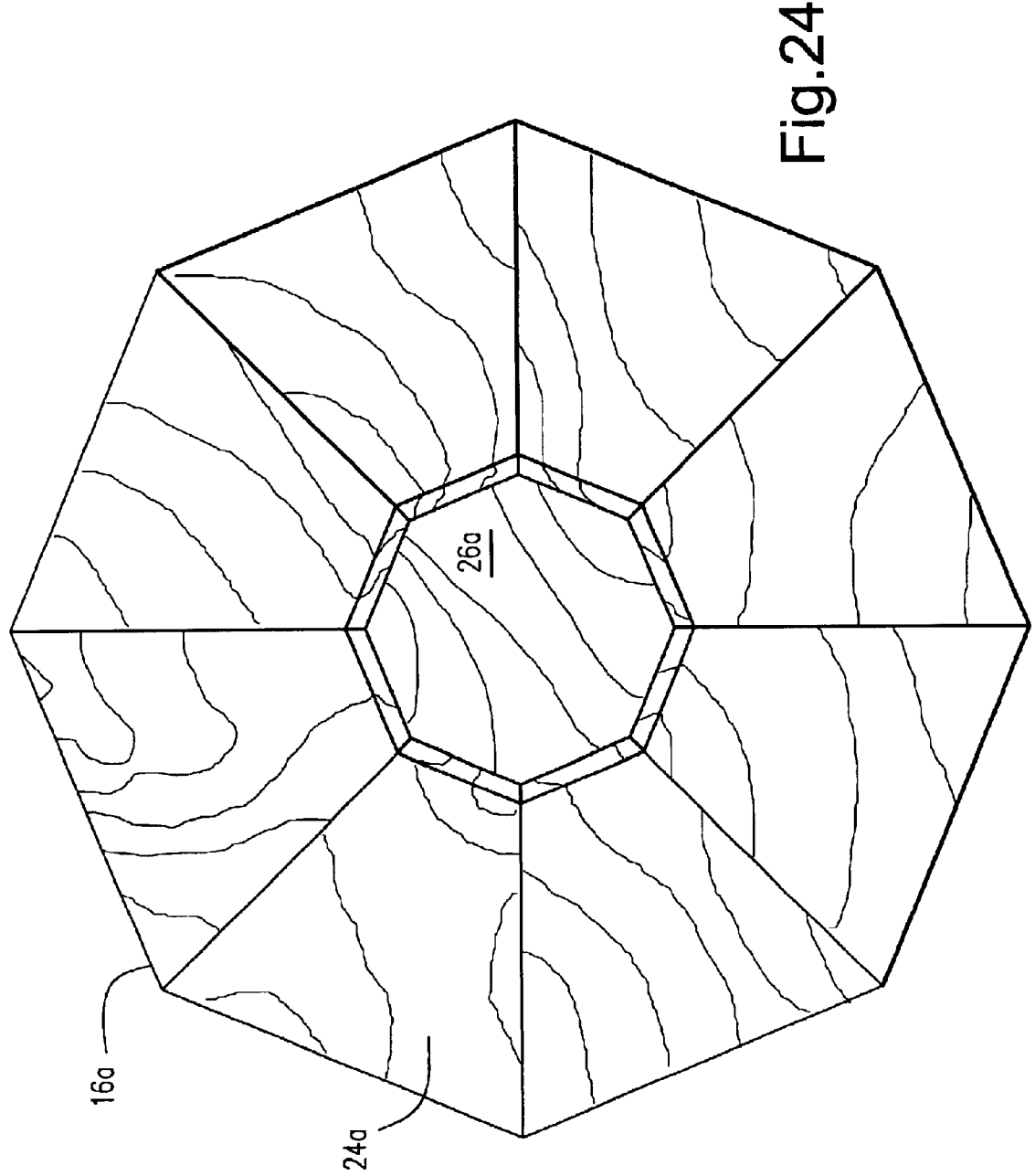
FIG. 24 is a bottom plan view thereof.

Referring to FIG. 2, there is illustrated a somewhat similar preferred embodiment wherein like reference numerals apply to like parts, followed by the suffix "a." In this embodiment, the composite container 12a is generally in the shape of an octagon. Thus, the plastic inner shell 14a has a margin including eight sides 28a with depending angled sides 30a, terminating in an octagonally-shaped flat bottom 32a (FIG. 17). Similarly, the outer shell 16a includes an upper margin having eight sides 22a with angled depending sides 24a terminating at the lower ends in an octagonally-shaped flat bottom 26a (FIG. 24). It will be appreciated that other forms of composite containers may be provided, for example, multi-sided forms such as hexagonal.

Figure 3:
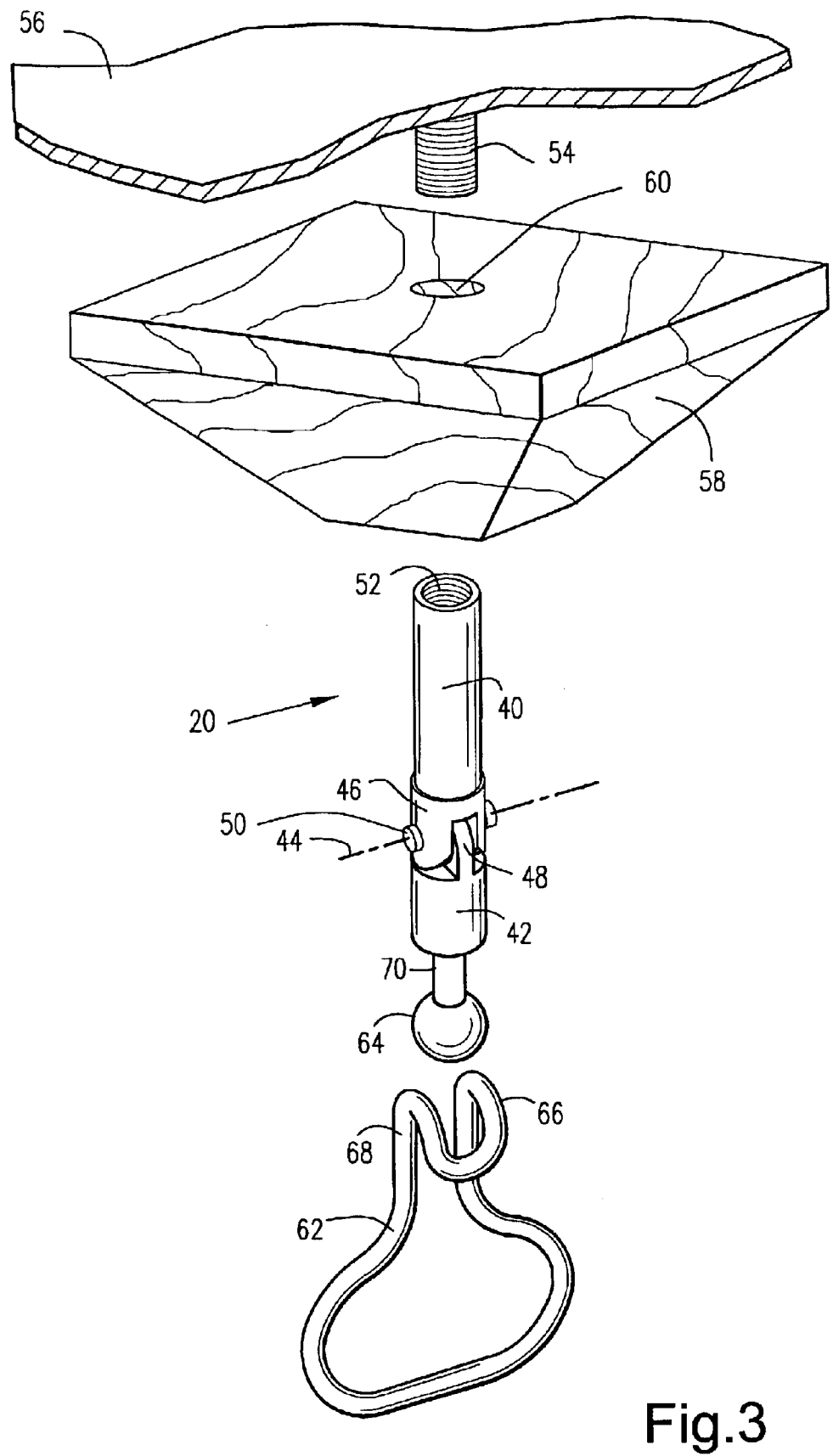
FIG. 3 is an exploded perspective view illustrating a portion of the system for suspending the container from a support.
Figure 6:
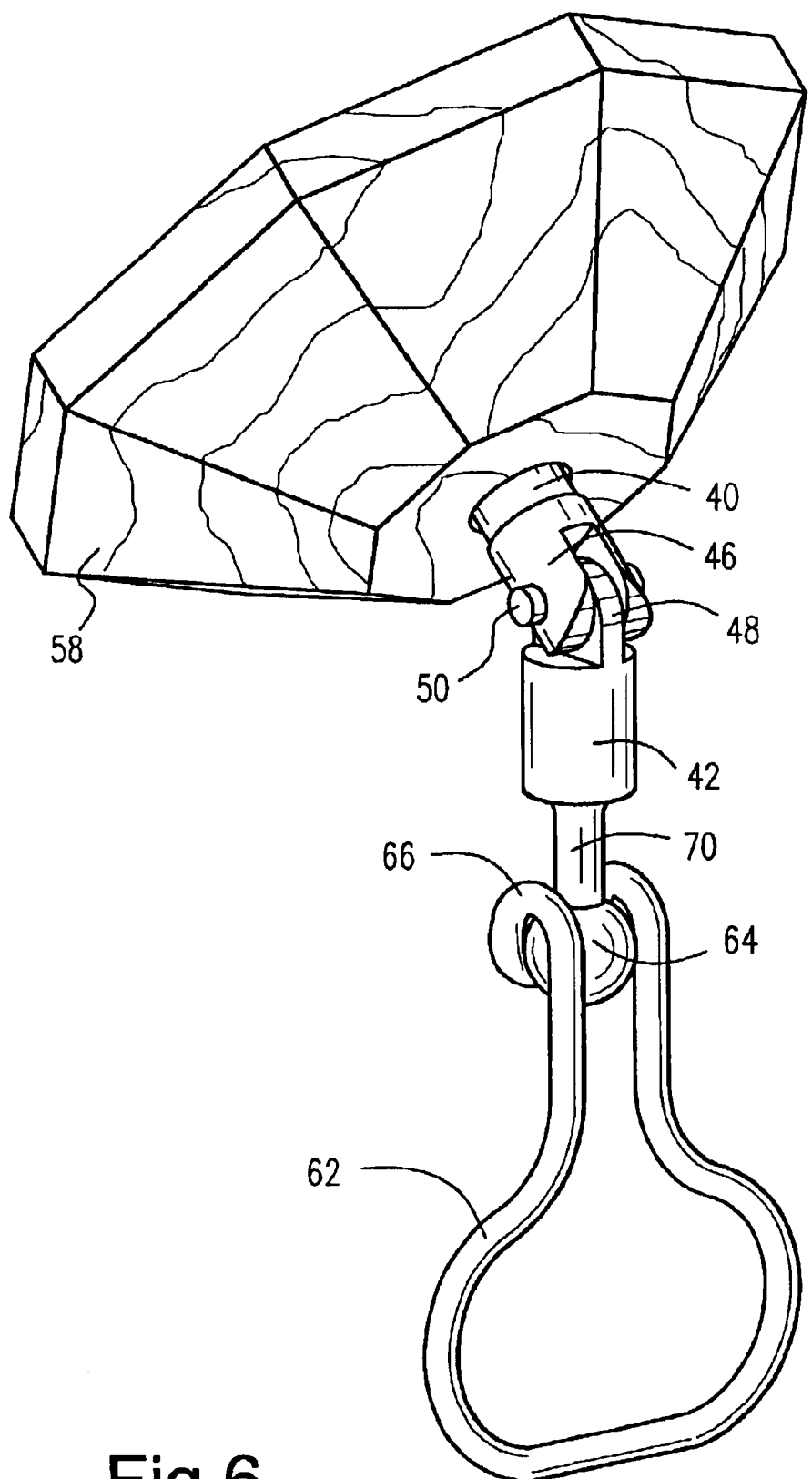
FIG. 6 is a perspective view illustrating an upper end portion of the suspension system.

The composite containers 12 and 12a are suspended from a mounting assembly 20 which is identical for each of the differently-shaped composite containers 12. Referring to FIGS. 3 and 6, the mounting assembly 20 includes first and second links 40 and 42 pivoted one to the other about a pivot axis 44. The lower end of the first link 40 terminates in a clevis 46 which receives a tongue 48 of the second link. A pin 50 passes through the clevis 46 and tongue 48 to form the pivotal connection between links 40 and 42. The upper end of the first link 40 includes a threaded bore 52 for threaded engagement with an externally threaded bolt 54 secured in a support 56. Preferably, the link 40 passes through a decorative piece 58 having a central opening 60 such that the decorative piece 58 is secured between the first link 40 and the support 56 in final assembly. Piece 58 is preferably aesthetically matched to the outer shell 16. It will also be appreciated that there are many and different types of connections available for securing link 40 to the support 56 and the present invention is not limited to the illustrated connection.

The second link 42 and a connecting element 62 are connected one to the other to afford a universal joint therebetween. Preferably, the second link 42 terminates at its lower end in a portion of a spherical ball 64. The element 62 is preferably in the form of a closed loop formed of wire having preferably a decorative or colored plastic coating and terminating at its upper end in an angled hook 66. The hook 66 includes wire portions 68 of the element 62 spaced one from the other a distance less than the diameter of the ball 64 but greater than the diameter of the shank 70 supporting the ball 64 from the second link 42. The angled hook 66 is reversely bent such that, upon receiving the shank 70 between the wire portions 68, the ball 64 is located below the hook portion 66 (FIG. 6) whereby the element 62 is fully supported in a universal mounting from the second link 42.

Figure 4:
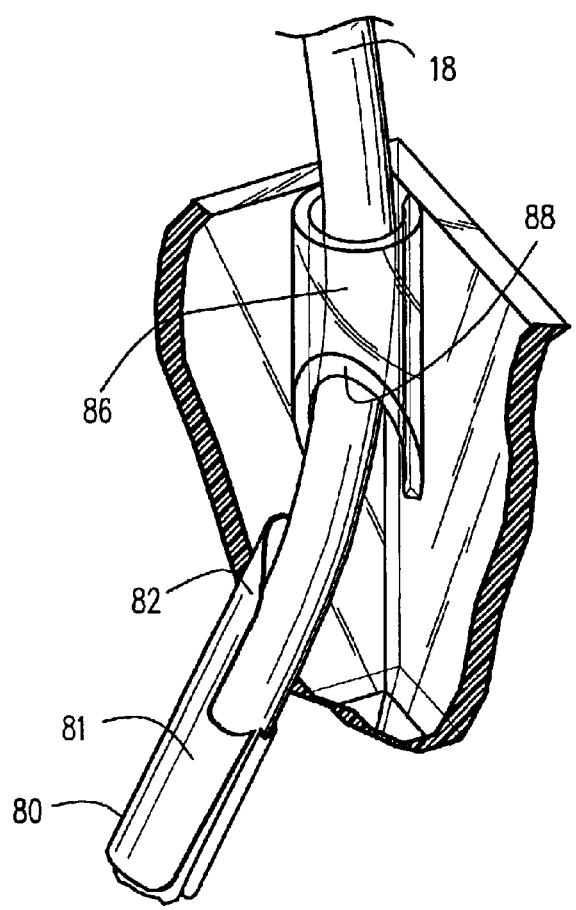
FIG. 4 is an enlarged fragmentary cross-sectional perspective view illustrating a bracket between adjoining sides of a container and a keeper at the end of a container support line prior to pulling the support line taut.
Figure 5:
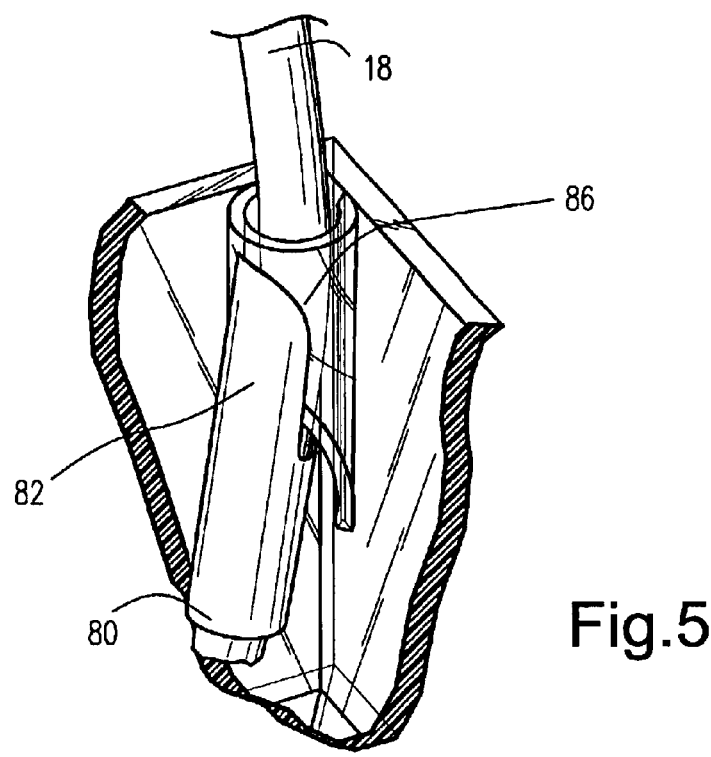
FIG. 5 is a view similar to FIG. 4 illustrating the bracket and keeper with the support line pulled taut and the keeper engaging the bracket.

Interconnecting the composite container 12 and the connecting element 62 are a plurality of lines 18, preferably formed of a decorative textile string material forming part of the suspension system. The lines can be secured at their upper ends to the element 62 by looping the lines about element 62 as illustrated or by tying knots. The lower ends of the lines terminate in stops or keepers 80 (FIG. 4). Each keeper 80 comprises an elongated channel-shaped metal body having a lower section which is crimped about the end of the line 18. As illustrated in FIG. 4, the lower section 81 of each keeper 80 which is crimped extends approximately one-half the length of the keeper such that its upper section 82 may be pivoted about the lower section 81 toward and away from the line 18. Thus, the upper section 82 has a width less than the lower section 81 and a tapered upper end.

The adjoining margins or sides of each inner shell or container are provided with brackets 86. Brackets 86 are preferably generally semi-cylindrical in shape and may, for example, be formed of plastic material. Brackets 86 may be suitably secured at their marginal edges, for example, by an adhesive to the adjoining walls of the container or inner shell or may be formed integral with the plastic shell, such as by injection molding. Thus, the brackets 86 form an aperture with the adjoining walls for receiving the keepers 80 and lines 18 attached to the keepers upon installation. For example, the keepers 80, including the crimped lower ends of the lines, may be passed through the apertures of the brackets 86 to locate the keepers below the lower angled opening 88 of the brackets 86 as illustrated in FIG. 4. When the lines 18 are pulled taut, the tapered tips of the upper sections 82 engage the brackets, causing the brackets to pivot about the lower sections 81 which, in turn, causes the upper sections 82 to engage along the exterior of the brackets 86. This engagement of keepers 80 and the brackets retains the lines.18 on the inner shell of the container and prevents withdrawal of the lines from the brackets. By threading the brackets 86 and lower ends of the lines 18 through the apertures formed by brackets 86 and the adjoining margins of the inner shell or container, the suspension system is easily and readily assembled to the container or the inner shell. It will be appreciated that the composite container or inner shell is supported by three or more lines. Consequently, at least three or more brackets may be used and applied symmetrically about the upper margins of the container or inner shell and not necessarily between each adjoining side margin of the container or inner shell. Brackets 86 may be secured between alternate adjoining side margins, e.g., as illustrated in FIG. 2.

Referring now to FIG. 7, the inner shell 14 is illustrated in a position poised to nest within the outer shell 16. As illustrated, the outer shell 16 is preferably formed of a decorative material, for example, wood, which may be stained and finished as desired. Note that the inner surface of the outer shell corresponds in configuration and dimension to the outer surface of the inner shell whereby the inner shell nests within the outer shell. By securing the inner and outer shells to one another, for example, by adhesive, a composite container is formed which is aesthetically pleasing in appearance, particularly when suspended from a ceiling.

It will also be appreciated that the container may be formed only of the inner shell per se. For example, the inner shell, being formed of a plastic material, may be used by itself without the outer overlay of a second outer decorative container. The inner shell may therefore be formed of a clear plastic material or it may be painted or provided with other decorative patterns, as desired. The inner shell 14 is illustrated in various drawing FIGS. 8–11.

Figure 13:
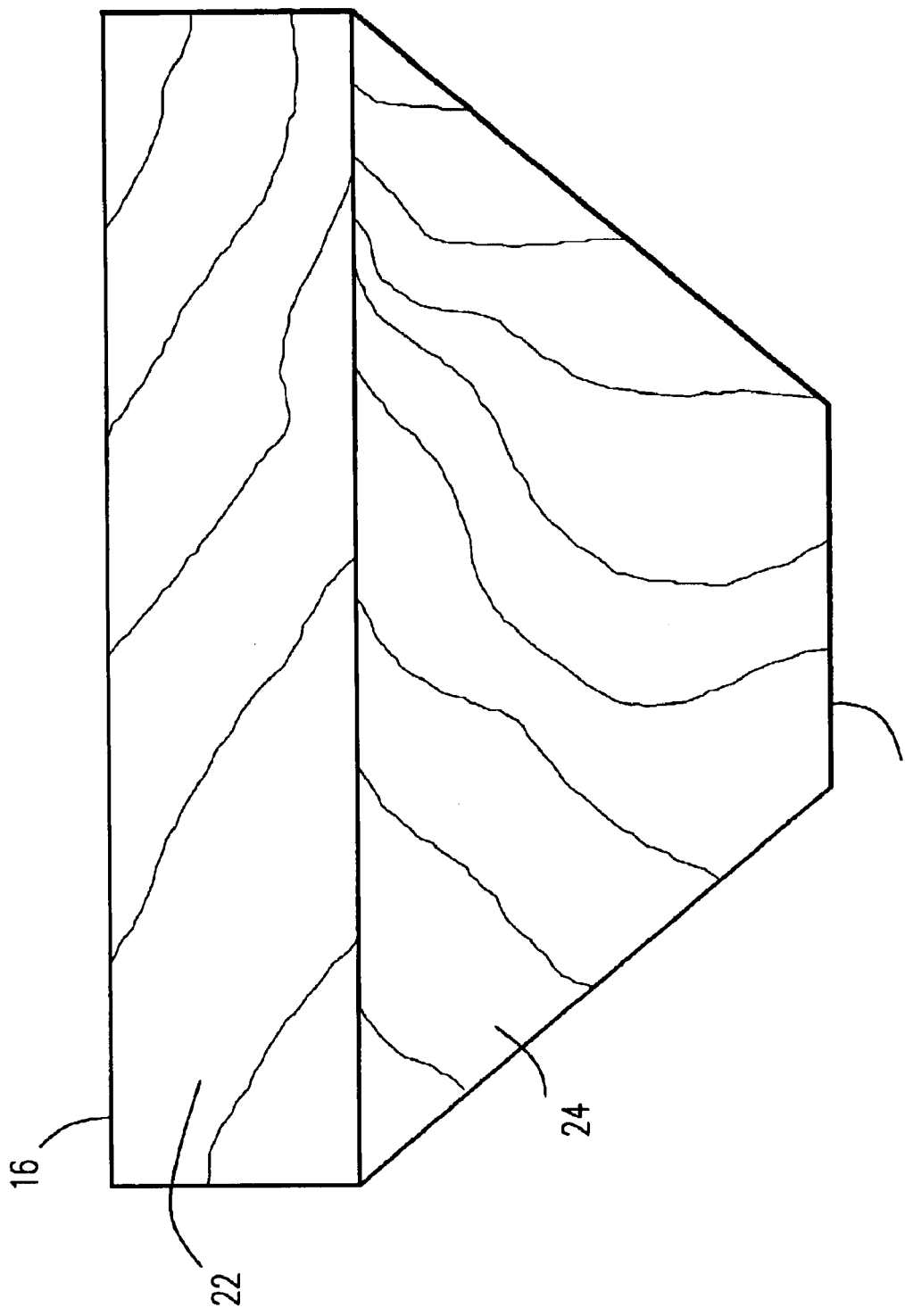
FIG. 13 is a side elevational view thereof, the other sides being identical.
Figure 16:
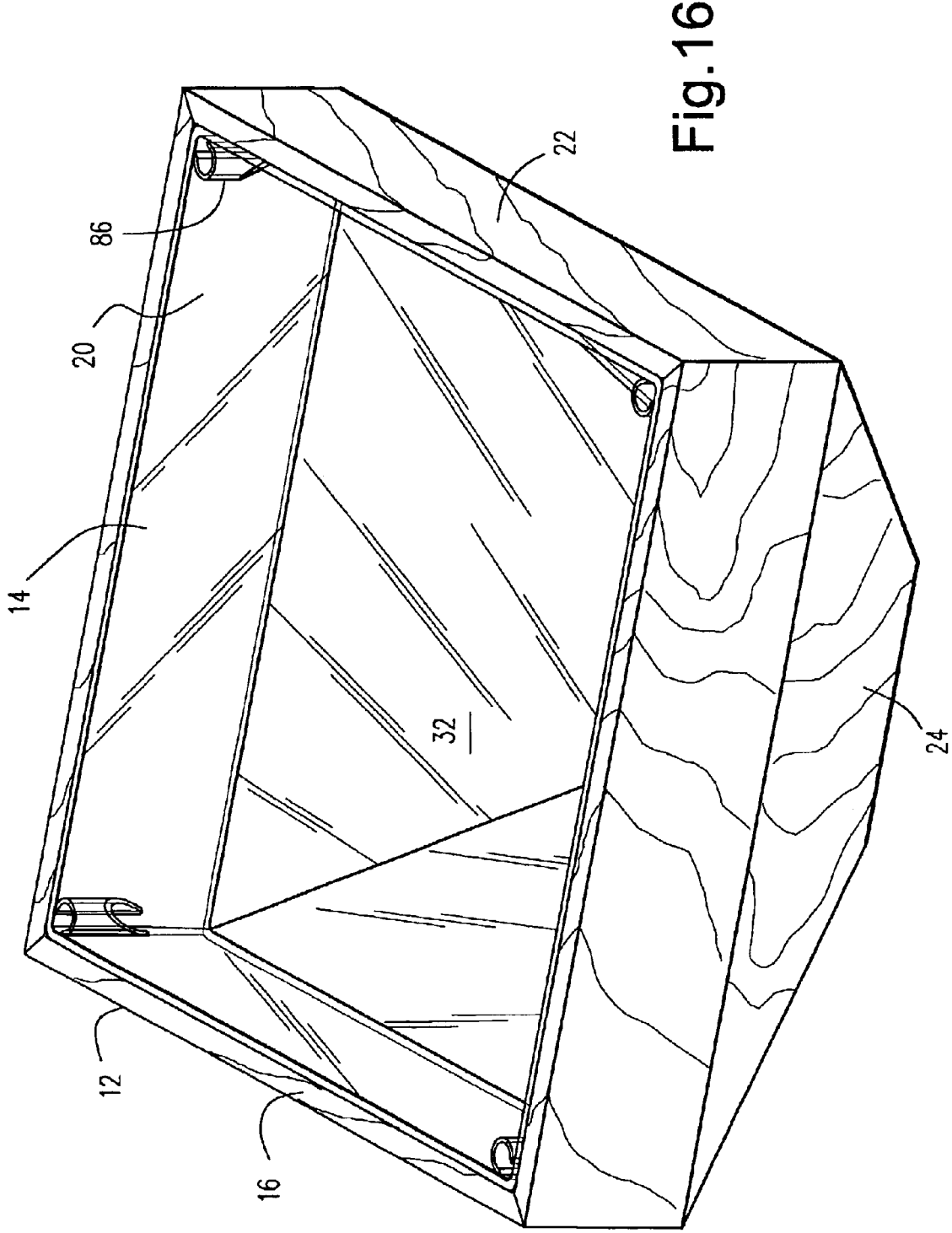
FIG. 16 is a perspective view illustrating a composite container including inner and outer shells of FIGS. 8 and 12, respectively, in assembly.

Referring to FIGS. 12–15, the outer shell 16 is illustrated. It will be appreciated that the outer shell may be formed of wood. The outer shell 16 illustrated in these drawing figures is square in configuration, having an upper margin 22 and inwardly inclined depending side walls 24 terminating in a bottom wall 26 (FIG. 13). Preferably, however, the inner and outer shells are used together, for example, as illustrated in FIG. 16 to form a composite container.

Referring now to FIGS. 17–20, the inner shell may be formed in an octagonal shape and may constitute a container per se without using the outer shell illustrated in drawing FIGS. 21–24. Thus, the inner shell as illustrated may be formed of a clear plastic material having an upper margin 28a with eight side walls 28a, and eight downwardly inclined depending side walls 30a terminating in a bottom wall 32a. Similarly as in the preceding embodiment, the inner shell may be decorated by painting or placing designs thereon, or formed of a colored plastic material when used alone without an overlying outer shell.

Figure 22:
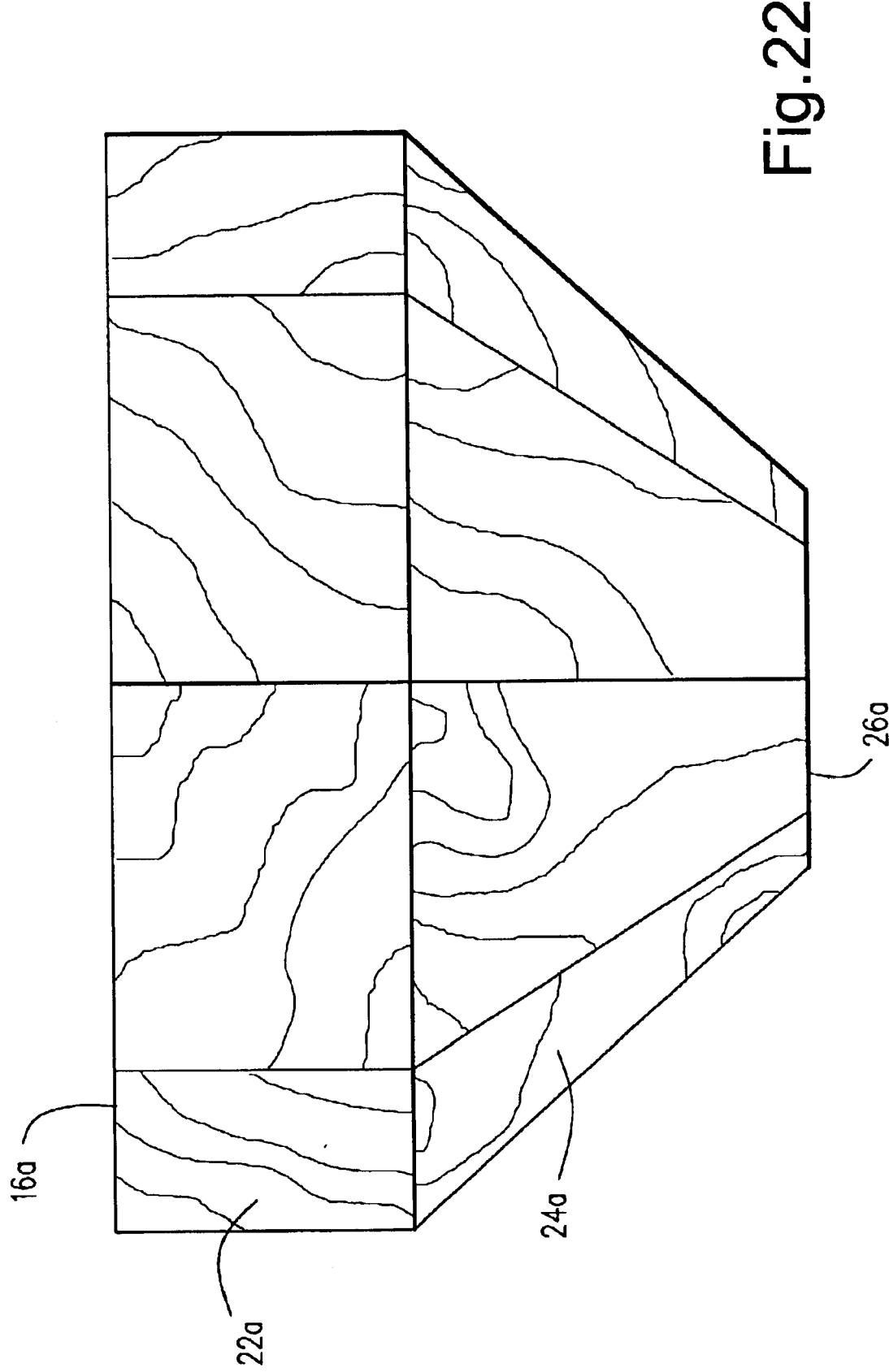
FIG. 22 is a side elevational view thereof.
Figure 23:
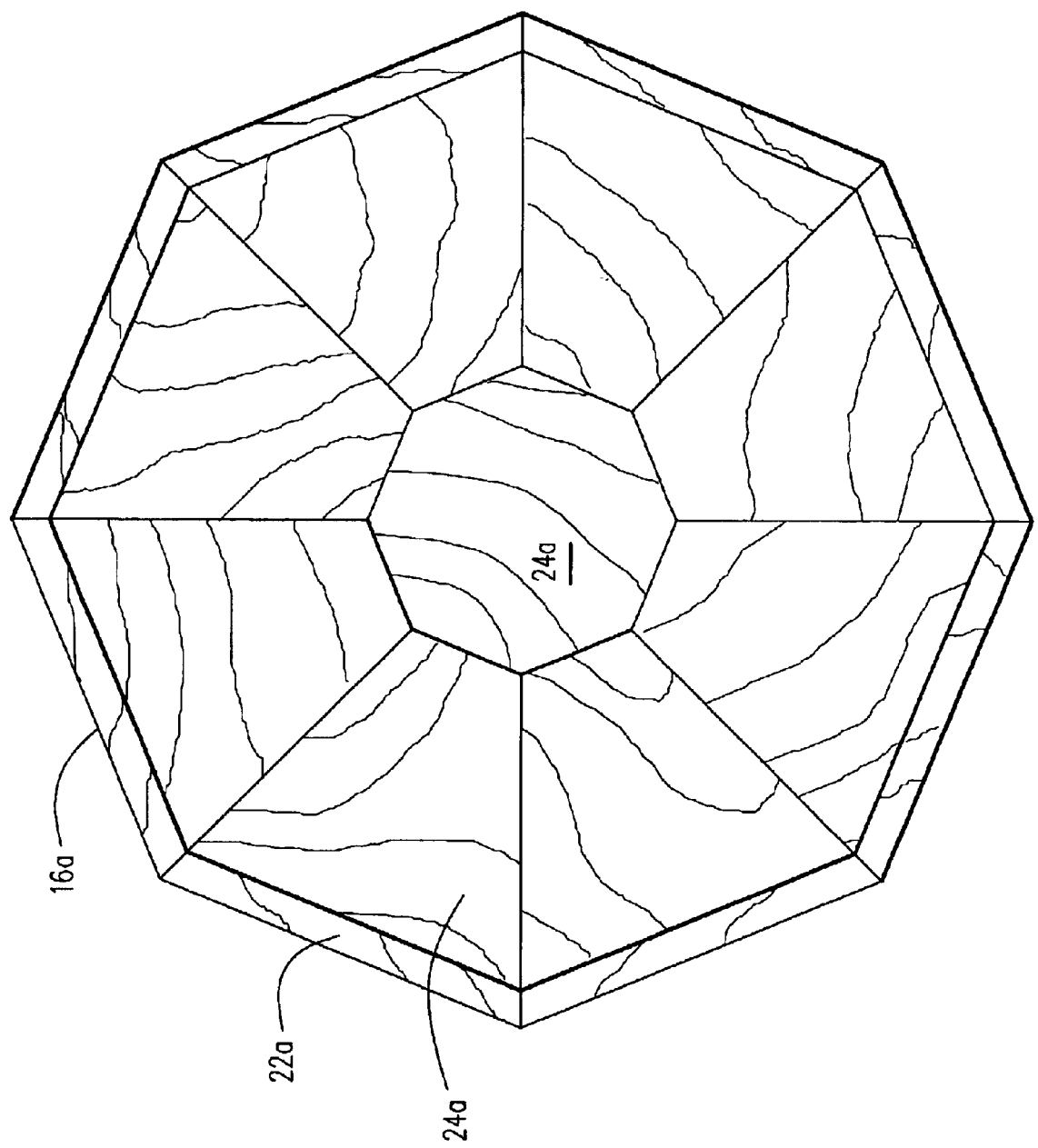
FIG. 23 is a top plan view thereof.
Figure 25:
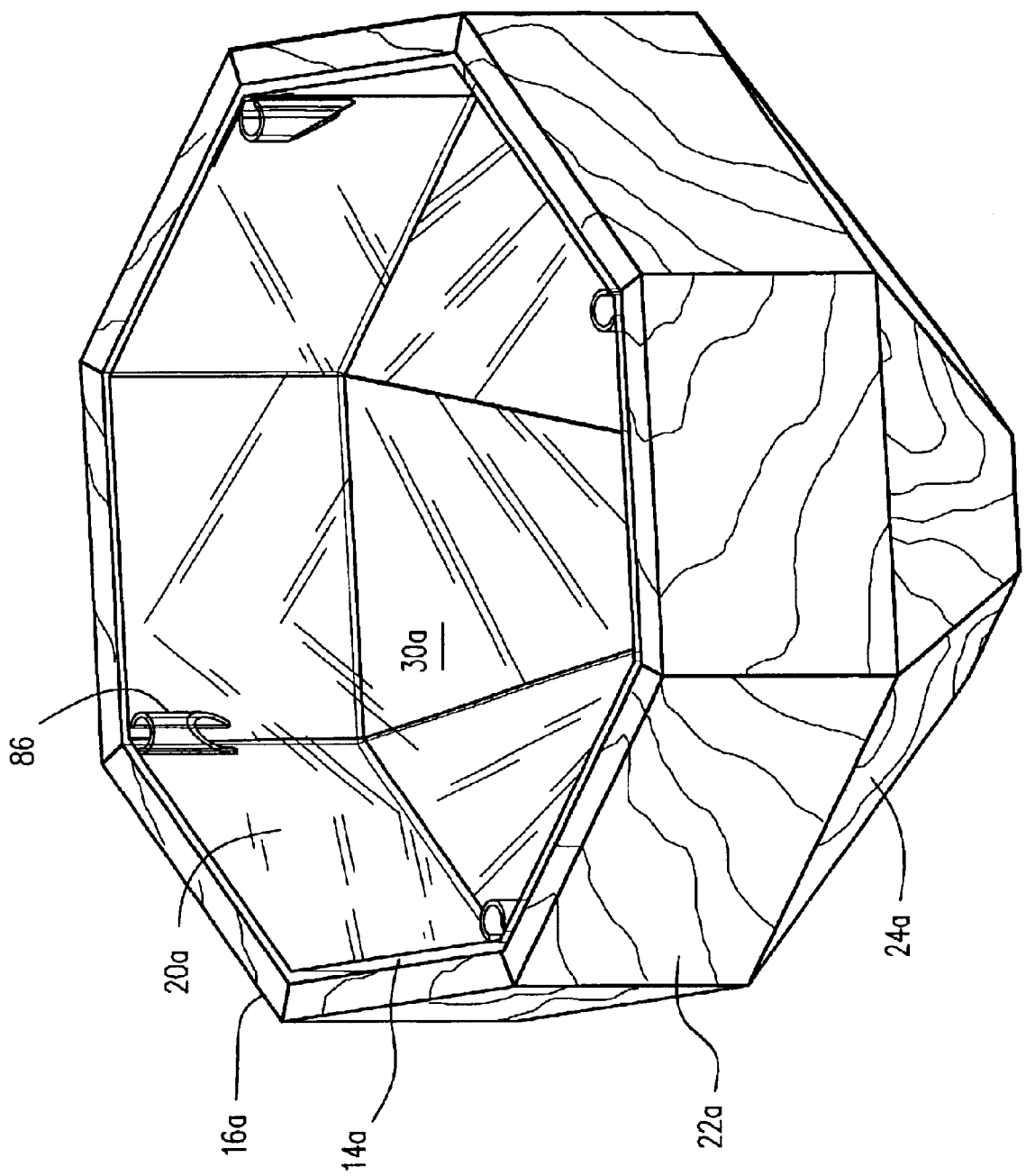
FIG. 25 is a perspective view illustrating the inner and outer shells of FIGS. 17 and 21, respectively, in assembled condition to form a composite container.

The inner shell of FIGS. 17–20 may be used with an outer shell as illustrated in FIGS. 21–24, if desirable, to form, e.g., a composite octagonal container. In this form, the outer shell 16a may be multi-sided, i.e., eight sides 22a adjacent the upper margin, with eight depending inclined side walls 24a terminating in a lower bottom wall 26a (FIG. 22). The interior surface of the outer shell preferably corresponds to the exterior surface of the inner shell, wherein the inner shell is nested within the outer shell to form the composite container 12a as illustrated in FIG. 25.

Figure 26:
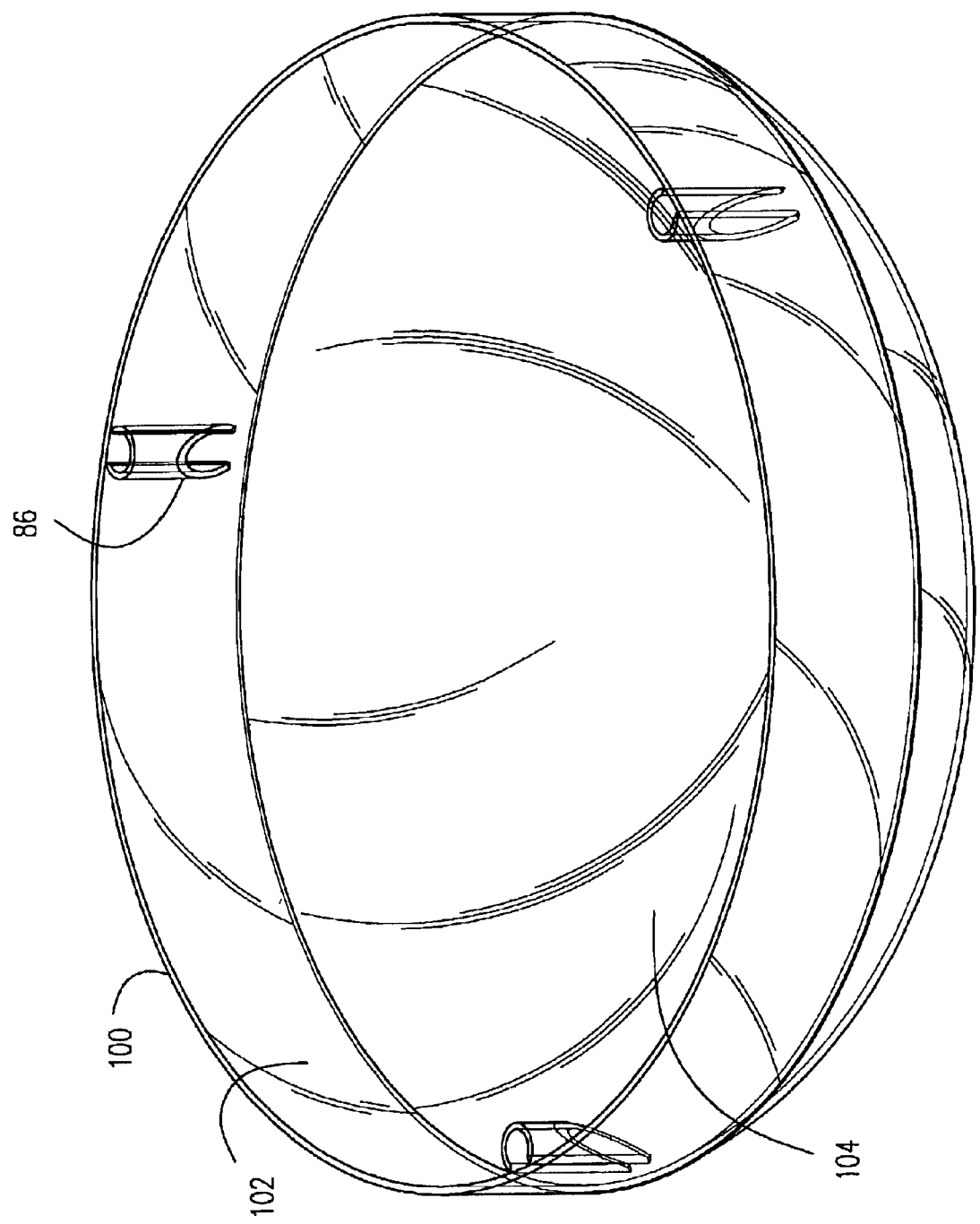
FIG. 26 is a perspective view of a container according to a further embodiment hereof.

Referring now to FIG. 26, there is illustrated a container 100 according to a further embodiment of the present invention for use with the suspension system previously described and illustrated. Container 100 preferably comprises an upper annular margin 102 with a depending shallow arcuate bottom 104. Container 100 is preferably formed of a plastic material and, as such, is waterproof. Brackets 86 are disposed at symmetrically located positions about the interior of the margin 102. Three brackets 86 are shown and thus are 120° apart. It will be appreciated that additional brackets, preferably symmetrically arranged about margin 102, may be provided. Container 100, similarly as the inner shells previously described and which may be used by themselves as containers, may have a decorative design, or be formed integrally with a particular color. With the brackets 86, the suspension assembly, including the lines 18, keepers 80 and mount assembly 20 may be employed to suspend the container 100 from a support, for example, the support 56 illustrated in FIG. 3.

Figure 27:
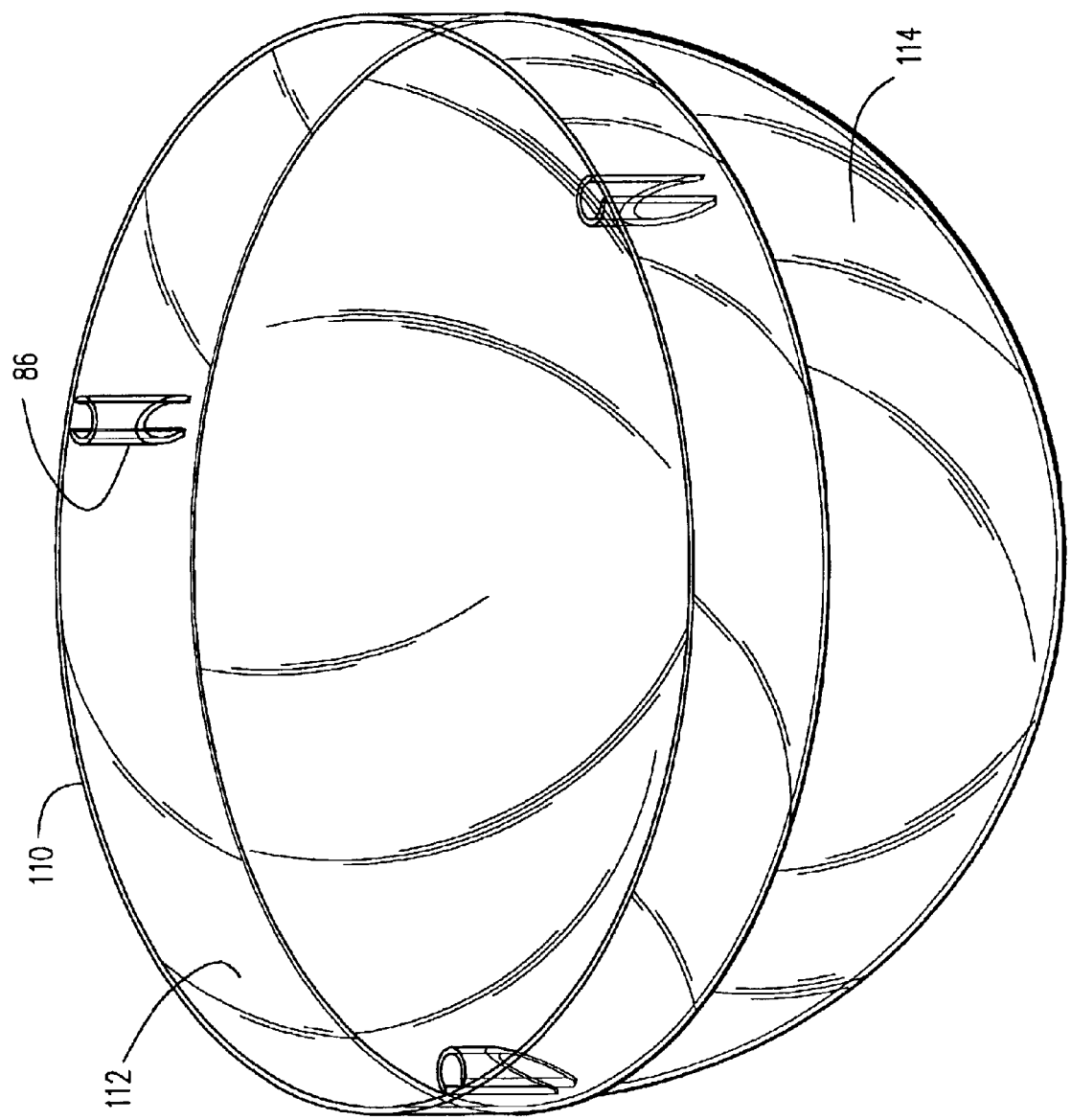
FIG. 27 is a view similar to FIG. 26 illustrating a still further container hereof.

Referring to FIG. 27, there is illustrated a similar container 110 having an upper annular margin 112 and a depending semi-spherical bottom 114. Thus, the bottom 114 is deeper than the shallow bottom 104 of container 100. As in the prior embodiment, brackets 86 are located preferably symmetrically about the margin 112 and it will be appreciated that additional brackets may be provided as desired. The suspension lines and mounting assembly previously described may likewise be utilized to suspend container 110 from a support, for example, the support 56 of FIG. 3.

While the invention has been described in connection with what is presently considered to be the most practical and preferred embodiment, it is to be understood that the invention is not to be limited to the disclosed embodiment , but on the contrary, is intended to cover various modifications and equivalent arrangements included within the spirit and scope of the appended claims.

What is claimed is:

1. A display apparatus comprising:
   a container for receiving at least one article for display;
   a system for suspending the container from a support including a mounting assembly and at least three elongated flexible lines extending between the container and the mounting assembly;
   said mounting assembly having a first link for securement to the support, a second link coupled to said first link and an element connecting said second link and upper ends of said flexible lines, said element and said second link being coupled to one another for universal movement;
   said container including a plurality of support brackets secured thereto, each bracket at least in part defining an aperture, a lower end of each flexible line being secured to said bracket and received through the aperture thereof, each of said flexible lines having a keeper for securing the lower end of the line to the bracket.

2. Apparatus according to claim 1 wherein said container has multiple sides and said brackets extend between adjoining multiple sides and along inside surfaces thereof.

3. Apparatus according to claim 2 wherein said aperture is defined by said bracket and the adjoining sides of said container.

4. Apparatus according to claim 1 wherein one of said element and said second link includes a generally spherical ball-shaped part and another of said element and said second link includes a substantially closed loop having a hook with spaced hook-shaped portions engageable about the spherical ball-shaped part enabling universal movement of said second link and said element relative to one another.

5. Apparatus according to claim 4 wherein said spherical ball-shaped part is carried by said second link, said lines being secured at said upper ends to said loop.

6. Apparatus according to claim 1 wherein said container is multi-sided and has linearly extending upper margins, said multiple-sided container having at least four sides, each of said keepers being carried by and secured to one of the flexible lines.

7. Apparatus according to claim 1 wherein, said container is formed of a plastic material.

8. Apparatus according to claim 7 including an outer shell having an interior shape generally corresponding to an exterior shape of the first-mentioned container, enabling said first container to comprise an inner shell nested within said outer shell to form a composite container.

9. Apparatus according to claim 8 wherein said first and second shells are multi-sided, having linearly extending upper margins, said multi-sided shells having at least four sides.

10. Apparatus according to claim 1 wherein said container has a bottom portion thereof shaped to correspond to a portion of a sphere and an upper margin defining an opening into the container, said brackets being spaced from one another about and secured along an interior surface of said margin.

11. Apparatus according to claim 1 wherein said container has a shallow arcuate non-linear shape and an upper margin defining an opening into the container, said brackets being spaced from one another about and secured along an interior surface of said margin.

12. A display apparatus comprising:
a container for receiving at least one article for display and having a multi-sided upper margin;
a system for suspending the container from a support including a mounting assembly and at least three elongated flexible lines extending between the container and the mounting assembly;
said mounting assembly including a universal connection between upper ends of said flexible lines and the support comprised of a spherical ball-shaped link and a closed loop having a hook with spaced hook-shaped portions engageable about the spherical ball-shaped part;
said container including a plurality of support brackets spaced from one another and secured about the interior sides of said upper margin, each bracket at least in part defining an aperture, a lower end of each flexible line being secured to said bracket and received through the aperture thereof, each of said flexible lines having a keeper for securing the lower end of the line to the bracket.

13. Apparatus according to claim 12 wherein said brackets extend between adjoining multiple sides of said upper margin, each of said keepers being sized to pass through said aperture and pivot relative to said line to retain the line secured to the container.

14. Apparatus according to claim 13 wherein said aperture is defined by said-bracket and the adjoining sides of said container.

15. Apparatus according to claim 12 wherein said lines are secured at said upper ends to said loop.

16. Apparatus according to claim 12 wherein said container is formed of a plastic material.

17. Apparatus according to claim 16 including an outer shell having an interior shape generally corresponding to an exterior shape of the first-mentioned container, enabling said first container to comprise an inner shell nested within said outer shell to form a composite container.

18. A display apparatus comprising:
a container for receiving at least one article for display and having a multi-sided upper margin;
a system for suspending the container from a support including a mounting assembly and at least three elongated flexible lines extending between the container and the mounting assembly;
said mounting assembly including an element forming at least in part a universal connection between upper ends of said flexible lines and the support;
said container including a plurality of support brackets spaced from one another and secured about interior sides of said upper margin, each bracket at least in part defining an aperture, a lower end of each flexible line being secured to said bracket and received through the aperture thereof, each of said flexible lines having a keeper for securing the lower end of the line to the bracket;
said container being formed of a plastic material;
an outer shell having an interior shape generally corresponding to an exterior shape of the first-mentioned container, enabling said first container to comprise an inner shell nested within said outer shell to form a composite container; and
an adhesive between said inner and outer shells to secure the shells to one another.

* * * * *